United States Patent
Sugano

(10) Patent No.: US 7,245,290 B2
(45) Date of Patent: Jul. 17, 2007

(54) HANGUL CHARACTER INPUT METHOD, HANGUL CHARACTER INPUT DEVICE, HANGUL CHARACTER INPUT PROGRAM AND COMPUTER MEDIA WITH HANGUL CHARACTER INPUT PROGRAM

(75) Inventor: Jin Sugano, Kawasaki (JP)

(73) Assignee: Kawasaki Limited, Kawasaki (JP)

( * ) Notice: Subject to any disclaimer, the term of this patent is extended or adjusted under 35 U.S.C. 154(b) by 847 days.

(21) Appl. No.: 10/664,910

(22) Filed: Sep. 22, 2003

(65) Prior Publication Data

US 2004/0059569 A1 Mar. 25, 2004

(30) Foreign Application Priority Data

Sep. 20, 2002 (JP) ............................. 2002-275357
Sep. 5, 2003 (JP) ............................. 2003-313996

(51) Int. Cl.
*G09G 5/00* (2006.01)
(52) U.S. Cl. .......................................... 345/169; 704/8
(58) Field of Classification Search ................ 345/169; 704/8

See application file for complete search history.

(56) References Cited

U.S. PATENT DOCUMENTS

| 6,170,000 B1* | 1/2001 | Bories et al. ................ 715/535 |
| 2003/0088398 A1* | 5/2003 | Guo et al. ..................... 704/8 |
| 2006/0227016 A1* | 10/2006 | Fux ............................. 341/22 |

* cited by examiner

*Primary Examiner*—Daniel Abebe
(74) *Attorney, Agent, or Firm*—Staas & Halsey LLP

(57) ABSTRACT

A controller assigns initial sound component groups to buttons and specifies the group corresponding to the hit button, and assigns medium sound component groups to buttons and specifies the group corresponding to the hit button. The two-component Hangul characters that are combinations of the specified groups, the numbers of three-component Hangul characters that are combinations of the two-component Hangul characters and lax final sound components or un-lax final sound components are assigned to the buttons. When the button assigned to the character is hit, the two-component Hangul character is confirmed. When the button assigned to the number is hit, three-component Hangul characters corresponding to the number are assigned to the buttons. When the button assigned to the character is hit, the three-component Hangul character is confirmed.

13 Claims, 18 Drawing Sheets

FIG.4

| Button | Candidate |
|---|---|
| 1 | ㄱ ㅋ |
| 2 | ㄴ ㄸ |
| 3 | ㄷ ㅌ |
| 4 | ㄹ ㄲ |
| 5 | ㅁ ㅃ |
| 6 | ㅂ ㅍ |
| 7 | ㅅ ㅆ |
| 8 | ㅇ |
| 9 | ㅈ ㅊ |
| 0 | ㅎ ㅉ |

FIG.5

| Button | Candidate |
|---|---|
| 1 | ㅏ |
| 2 | ㅑ ㅖ |
| 3 | ㅓ ㅔ |
| 4 | ㅕ ㅗ |
| 5 | ㅗ ㅙ |
| 6 | ㅛ ㅐ |
| 7 | ㅜ ㅞ |
| 8 | ㅠ ㅟ |
| 9 | ㅡ ㅘ |
| 0 | ㅣ ㅝ |
| * | ㅐ |
| # | ㅢ |

| | | | | | | | |
|---|---|---|---|---|---|---|---|
| 가 | 각 | 간 | 갇 | 갈 | 감 | 갑 | 갓 | 강 |
| 개 | 객 | 갠 | | 갤 | 갬 | 갭 | 갯 | 갱 |
| 갸 | 갹 | 갼 | | 걀 | | | 걋 | 걍 |
| 걔 | | 걘 | | 걜 | | | | |
| 거 | 격 | 건 | 걷 | 결 | 검 | 겁 | 것 | 겅 |
| 게 | | 겐 | | 겔 | 겜 | 겝 | 겟 | 겡 |
| 겨 | 격 | 견 | 겯 | 결 | 겸 | 겹 | 겻 | 경 |
| 계 | | 곈 | | 곌 | 곕 | | 곗 | |
| 고 | 곡 | 곤 | 곧 | 골 | 곰 | 곱 | 곳 | 공 |
| 과 | 곽 | 관 | | 괄 | 괌 | 곱 | 괏 | 광 |
| 괘 | | 괜 | | 괠 | 괨 | | | 괭 |
| 괴 | 곽 | 괸 | | 괼 | 굄 | 굅 | 굇 | 굉 |
| 교 | | 굔 | | 굘 | | 굡 | 굣 | |
| 구 | 국 | 군 | 굳 | 굴 | 굼 | 굽 | 굿 | 궁 |
| 궈 | 곽 | 권 | | 궐 | | | | 궝 |
| 궤 | | | | | | | 궷 | |
| 귀 | 귁 | 귄 | | 귈 | 귐 | 귑 | 귓 | |
| 규 | | 균 | | 귤 | | | | |
| 그 | 극 | 근 | 귿 | 글 | 금 | 급 | 긋 | 긍 |
| 긔 | | | | | | | | |
| 기 | 긱 | 긴 | 긷 | 길 | 김 | 깁 | 깃 | 깅 |
| 까 | 깍 | 깐 | | 깔 | 깜 | 깝 | 깟 | 깡 |
| 깨 | 깩 | 깬 | | 깰 | 깸 | 깹 | 깻 | 깽 |
| 꺄 | 꺅 | | | 꺌 | | | | |
| 꺼 | 꺽 | 껀 | | 껄 | 껌 | 껍 | 껏 | 껑 |
| 께 | 껙 | 껜 | | | 껨 | | 껫 | 껭 |
| 껴 | | 껸 | | 껼 | | | 껐 | |
| 계 | | | | | | | | |
| 꼬 | 꼭 | 꼰 | | 꼴 | 꼼 | 꼽 | 꼿 | 꽁 |
| 꽈 | 꽉 | | | 꽐 | | | | 꽝 |
| 꽤 | 꽥 | | | | | | | 꽹 |
| 꾀 | | 꾄 | | 꾈 | 꾐 | 꾑 | | 꾕 |
| 꾜 | | | | | | | | |
| 꾸 | 꾹 | 꾼 | | 꿀 | 꿈 | 꿉 | 꿋 | 꿍 |
| 꿔 | | | | 꿜 | | | | 꿩 |
| 꿰 | 꿱 | 꿴 | | 꿸 | 꿴 | 꿰 | | |
| 뀌 | | 뀐 | | 뀔 | 뀜 | 뀝 | | |
| 뀨 | | | | | | | | |
| 끄 | 끅 | 끈 | | 끌 | 끔 | 끕 | 끗 | 끙 |
| 끼 | 끽 | 낀 | | 낄 | 낌 | 낍 | 낏 | 낑 |

FIG.8

| | |
|---|---|
| 가 | 잤 갖 같 갖 갔 갉 갊 값 |
| 개 | 갰 |
| 갸 | |
| 걔 | |
| 거 | 젔 겉 겇 겊 겂 |
| 게 | 겠 |
| 겨 | 격 겼 곁 |
| 계 | |
| 고 | 곪 곳 곯 |
| 과 | 곪 |
| 괘 | 괬 |
| 괴 | |
| 교 | |
| 구 | 굵 굶 굻 |
| 궈 | 궜 |
| 궤 | |
| 귀 | |
| 규 | |
| 그 | 긁 |
| 긔 | |
| 기 | 깊 깂 |
| 까 | 깎 깠 깥 깗 |
| 깨 | 깼 |
| 꺄 | |
| 꺼 | 꺾 껐 |
| 께 | |
| 껴 | 꼈 곁 |
| 꼐 | |
| 꼬 | 꽃 꼲 |
| 꽈 | 꽜 |
| 꽤 | |
| 꾀 | |
| 꾜 | |
| 꾸 | 꿇 |
| 꿔 | 꿨 |
| 꿰 | 꿨 |
| 뀌 | |
| 뀨 | |
| 끄 | 끝 끊 끎 끓 |
| 끼 | |

FIG.11

| ㅏ | ㅑㅔ | ㅓㅖ |
|---|---|---|
| ㅕㅚ | ㅗㅙ | ㅍㅐ |
| ㅜㅔ | ㅠㅟ | ㅡㅘ |
| ㅐ | ㅣㅝ | ㅗ |

FIG.12

| 거 | 9 | 5 |
|---|---|---|
| 계 | 4 | 0 |
| 커 | 8 | 컸 |
| 케 | 0 | 켰 |

Fig. 16a

|  |  |  |
|---|---|---|
| ㄱㅋ | ㄴㄸ | ㄷㅌ |
| ㄹㄲ | ㅁㅃ | ㅂㅍ |
| ㅅㅆ | ㅇ | ㅈㅊ |
|  | ㅎㅉ |  |

Fig. 16b

| ㅈㅊ | | |
|---|---|---|
| ㅏ | ㅑㅖ | ㅓㅔ |
| ㅕㅚ | ㅗㅙ | ㅛㅐ |
| ㅜㅞ | ㅠㅟ | ㅡㅘ |
| ㅒ | ㅣㅝ | ㅢ |

Fig. 16c

|  |  |  |
|---|---|---|
| 저 | 8 | 젊 |
| 제 | 0 | 0 |
| 처 | 7 | 첫 |
| 체 | 2 | 0 |

Fig. 16d

|  |  |  |
|---|---|---|
| 적 | 전 |  |
| 절 | 점 | 접 |
| 젓 | 정 | 젖 |
|  |  |  |

Fig. 16e

| 전 | | |
|---|---|---|
| ㄱㅋ | ㄴㄸ | ㄷㅌ |
| ㄹㄲ | ㅁㅃ | ㅂㅍ |
| ㅅㅆ | ㅇ | ㅈㅊ |
|  | ㅎㅉ |  |

Fig. 16f

| 전ㅎㅉ | | |
|---|---|---|
| ㅏ | ㅑㅖ | ㅓㅔ |
| ㅕㅚ | ㅗㅙ | ㅛㅐ |
| ㅜㅞ | ㅠㅟ | ㅡㅘ |
| ㅒ | ㅣㅝ | ㅢ |

Fig. 16g

| 전 | | |
|---|---|---|
| 흐 | 8 | 3 |
| 화 | 5 | 0 |
| 쯔 | 3 | 0 |
| 쫘 | 2 | 쨌 |

Fig. 16h

| 전화 | | |
|---|---|---|
| ㄱㅋ | ㄴㄸ | ㄷㅌ |
| ㄹㄲ | ㅁㅃ | ㅂㅍ |
| ㅅㅆ | ㅇ | ㅈㅊ |
|  | ㅎㅉ |  |

FIG.17

| | ㄲ | ㅆ | ㅊ | ㅋ | ㅌ | ㅍ | ㅎ | ㄳ | ㄵ | ㄶ | ㄺ | ㄻ | ㄼ | ㄽ | ㄾ | ㄿ | ㅀ | ㅄ |
|---|---|---|---|---|---|---|---|---|---|---|---|---|---|---|---|---|---|---|
| 가 | | 갔 | 갖 | | 같 | 갚 | 강 | | | | | 갊 | | | | | | 값 |
| 개 | | 갰 | | | | | | | | | | | | | | | | |
| 갸 | | | | | | | | | | | | | | | | | | |
| 걔 | | | | | | | | | | | | | | | | | | |
| 거 | | 겄 | | | 겉 | 겊 | 겅 | | | | | 겂 | | | | | | |
| 게 | | 겠 | | | | | | | | | | | | | | | | |
| 겨 | 껴 | 겼 | | | 곁 | | | | | | | | | | | | | |
| 계 | | | | | | | | | | | | | | | | | | |
| 고 | | | | | | | | | | | | 곪 | 곬 | | | | | 곯 |
| 과 | | | | | | | | | | | | 곪 | | | | | | |
| 괘 | | 괬 | | | | | | | | | | | | | | | | |
| 괴 | | | | | | | | | | | | | | | | | | |
| 교 | | | | | | | | | | | | | | | | | | |
| 구 | | | | | | | | | | | | 굶 | | | | | | 굻 |
| 귀 | | 궜 | | | | | | | | | | | | | | | | |
| 궤 | | | | | | | | | | | | | | | | | | |
| 귀 | | | | | | | | | | | | | | | | | | |
| 규 | | | | | | | | | | | | | | | | | | |
| 그 | | | | | | | | | | | 긁 | | | | | | | |
| 긔 | | | | | | | | | | | | | | | | | | |
| 기 | | | | | 깊 | | | | | | | 김 | | | | | | |
| 까 | 꽈 | 깠 | | | 깥 | | | | | | | 깗 | | | | | | |
| 깨 | | 깼 | | | | | | | | | | | | | | | | |
| 꺄 | | | | | | | | | | | | | | | | | | |
| 꺼 | 껴 | 껐 | | | | | | | | | | | | | | | | |
| 께 | | | | | | | | | | | | | | | | | | |
| 껴 | | 꼈 | | | 곁 | | | | | | | | | | | | | |
| 계 | | | | | | | | | | | | | | | | | | |
| 꼬 | | 꽂 | | | | | | | | | | 꼼 | | | | | | |
| 꽈 | | 꽜 | | | | | | | | | | | | | | | | |
| 꽤 | | | | | | | | | | | | | | | | | | |
| 꾀 | | | | | | | | | | | | | | | | | | |
| 꾜 | | | | | | | | | | | | | | | | | | |
| 꾸 | | | | | | | | | | | | | | | | | | 꿇 |
| 꿔 | | 꿨 | | | | | | | | | | | | | | | | |
| 꿰 | | 꿨 | | | | | | | | | | | | | | | | |
| 뀌 | | | | | | | | | | | | | | | | | | |
| 뀨 | | | | | | | | | | | | | | | | | | |
| 끄 | | | | | 끝 | | | | | | | 끎 | 끍 | | | | | 끓 |
| 끼 | | | | | | | | | | | | | | | | | | |

Fig. 19a

| ㄱㅋ | ㄴㄸ | ㄷㅌ |
|---|---|---|
| ㄹㄲ | ㅁㅃ | ㅂㅍ |
| ㅅㅆ | ㅇ | ㅈㅊ |
|  | ㅎㅉ |  |

| ㅏ | ㅑㅖ | ㅓㅔ |
|---|---|---|
| ㅕㅚ | ㅗㅐ | ㅛㅒ |
| ㅜㅞ | ㅠㅟ | ㅡㅘ |
| ㅒ | ㅣㅝ | ㅢ |

Fig. 19c

| 가 | 9 | 8 |
|---|---|---|
|  |  |  |
| 카 | 7 | 0 |
|  |  |  |

Fig. 19d

|  | 갔 | 갖 |
|---|---|---|
|  | 같 | 갚 |
| 갛 |  |  |
|  | SHIFT |  |

Fig. 19e

|  |  |  |
|---|---|---|
| 갉 | 갊 |  |
|  |  |  |
|  | 값 |  |

| ㄱㅋ | ㄴㄸ | ㄷㅌ |
|---|---|---|
| ㄹㄲ | ㅁㅃ | ㅂㅍ |
| ㅅㅆ | ㅇ | ㅈㅊ |
|  | ㅎㅉ |  |

FIG.20

| Lax sound | K ㄱ | N ㄴ | T ㄷ | R ㄹ | M ㅁ | P ㅂ | S ㅅ | なし ㅇ | C ㅈ |
|---|---|---|---|---|---|---|---|---|---|
| Aspirated sound | KH ㅋ | | TH ㅌ | | | RH ㅍ | | H ㅎ | CH ㅊ |
| Fortis sound | KK ㄲ | | TT ㄸ | | | PP ㅃ | SS ㅆ | | CC ㅉ |

FIG.21

| | A ㅏ | EO ㅓ | O ㅗ | U ㅜ | EU ㅡ | I ㅣ | AE ㅐ | E ㅔ | OE ㅚ | EUI ㅢ |
|---|---|---|---|---|---|---|---|---|---|---|
| No semivowel | A ㅏ | EO ㅓ | O ㅗ | U ㅜ | EU ㅡ | I ㅣ | AE ㅐ | E ㅔ | OE ㅚ | EUI ㅢ |
| Semivowel "y" | YA ㅑ | YEO ㅕ | YO ㅛ | YU ㅠ | | | YAE ㅒ | YE ㅖ | | |
| Semivowel "w" | WA ㅘ | WEO ㅝ | | | | WI ㅟ | WAE ㅙ | WE ㅞ | | |

FIG.22

| Lax final sound components (9) | | ㄱ ㄴ ㄹ ㅁ ㅂ ㅅ ㅇ ㅈ |
|---|---|---|
| Un-lax final sound components (18) | Un-doublet final sound components (7) | ㅋ ㅊ ㅋ ㅌ ㅍ ㅎ |
| | Doublet final sound components (11) | ㄳ ㄵ ㄶ ㄺ ㄻ ㄼ ㄽ ㄾ ㄿ ㅀ ㅄ |

HANGUL CHARACTER INPUT METHOD, HANGUL CHARACTER INPUT DEVICE, HANGUL CHARACTER INPUT PROGRAM AND COMPUTER MEDIA WITH HANGUL CHARACTER INPUT PROGRAM

BACKGROUND OF THE INVENTION

1. Field of the Invention

The present invention relates to a Hangul character input method to input a Hangul character into a device such as a cellular phone having 12 through 18 buttons. Further, the present invention relates to a Hangul character input device to execute the Hangul character input method, a Hangul character input program to make a computer act as the Hangul character input device and a computer media in which the Hangul character input program is stored.

2. Prior Art

A Hangul character is a phonogram expressing a syllable of the Korean-language, and one Hangul character expresses one syllable. Each Hangul character is a combination of plural Hangul components that express a vowel (including a semivowel) and a consonant. Each component is classified in an initial sound component expressing a top consonant (or expressing there is no consonant), a medium sound component expressing a vowel and a final sound component expressing a consonant at the end. A Hangul character that consists of an initial sound component and a medium sound component in up-and-down or right-and-left is a "two-component Hangul character", and a Hangul character that combines a final sound component with a two-component Hangul character is a "three-component Hangul character". A medium sound component determines whether the components of a two-component Hangul character are arranged up-and-down or right-and-left.

There are nineteen varieties of initial sound components, twenty-one varieties of medium sound components, and twenty-seven varieties of final sound components. Therefore, there may be 399(=19×21) varieties of two-component Hangul characters and 10,773(=19×21×27) varieties of three-component characters, 11,172 varieties of Hangul characters in total theoretically. However, only about 2,300 varieties of characters are generally used. Therefore, the Korean standard cord table KSC5601 prescribes 2,350 varieties of Hangul characters only.

In this specification, a Hangul character prescribed in the Korean standard cord table KSC5601 is referred to as a "common Hangul character" and a Hangul character except a common Hangul character is referred to as an "uncommon Hangul character".

According to the above construction of a Hangul character, any Hangul character can be input into a computer by selecting an initial sound component, a medium sound component and a final sound component (if necessary) sequentially. It is easy to input a Hangul character to a computer having a full-keyboard because all the initial, medium or final sound components can be assigned to the respective buttons.

On the other hand, in a device having 12 through 18 buttons such as a cellular phone, since the number of buttons is smaller than the number of the Hangul components, each Hangul component must be divided into a plurality of elements (a vertical line, a horizontal line or the like) and a Hangul component is specified by a plurality of keystrokes. Varieties of the elements are smaller than varieties of Hangul components, which allows to assign the elements to a small number of buttons. The above-described Hangul character input method has been generally applied to conventional cellular phones that have e-mailing function.

However, the method for inputting a Hangul character by sequentially specifying elements of each Hangul component requires a large number of keystrokes to input a Hangul character. For example, 12 keystrokes are required at the maximum to input one Hangul character with a marketed cellular phone, which disturbed the efficiently input of a Hangul character string.

SUMMARY OF THE INVENTION

An object of the present invention is to provide an improved Hangul character input method that enables to input a Hangul character with a small number of keystrokes in an input device having 12 through 18 buttons. Further object of the present invention is to provide an improved Hangul character input device to execute the Hangul character input method, a Hangul character input program to make a computer act as the Hangul character input device and a computer media in which the Hangul character input program is stored.

A Hangul character input method according to a first aspect of the present invention includes a first specifying step for specifying one group of initial sound components stored in an initial-sound-component table, a second specifying step for specifying one group of medium sound components stored in a medium-sound-component table, a third specifying step for specifying one of two-component Hangul characters extracted from a two-component-Hangul-character table in response to combinations of the initial sound components in the group specified at the first specifying step and the medium sound components in the group specified at the second specifying step, or specifying one group of the three-component Hangul characters among the groups extracted from a three-component-Hangul-character table in response to the two-component Hangul characters extracted from the two-component-Hangul-character table, and a fourth specifying step for specifying one of three-component Hangul characters included in the group of the three-component Hangul character specified at the third specifying step. The fourth specifying step is optionally executed when the group of the three-component Hangul character is specified at the third specifying step.

With this method, a two-component Hangul character can be input through three keystrokes, which are a first keystroke to specify the group of the initial sound component, a second keystroke to specify the group of the medium sound component and a third keystroke to specify one of two-component Hangul characters extracted in response to the combinations of the specified initial and medium sound components. A three-component Hangul character can be input through four or five keystrokes, which are a first keystroke to specify the group of the initial sound component, a second keystroke to specify the group of the medium sound component, a third keystroke to specify one group of the three-component Hangul characters and a fourth keystroke to specify one of the three-component Hangul character included in the specified group. When the number of the three-component Hangul characters included in the specified group is larger than the number of buttons of the input device, a fifth keystroke is required.

The three-component-Hangul-character table may include a lax-three-component-Hangul-character table that stores groups of lax three-component Hangul characters that are combinations of two-component Hangul characters with lax final sound components each of which has the same shape as a lax initial sound component, and a un-lax-three-component-Hangul-character table that stores groups of un-lax three-component Hangul characters that are combinations of two-component Hangul characters with un-lax final sound components each of which has a different shape from a lax initial sound component. In such a case, one of the two-component Hangul characters, one group of lax three-component Hangul characters extracted from the lax-three-component-Hangul-character table in response to the two-component Hangul characters or one group of un-lax three-component Hangul characters extracted from the un-lax three-component-Hangul-character table in response to the two-component Hangul characters is specified at the third specifying step. Further, one of lax three-component Hangul characters in the group specified at the third specifying step or one of un-lax three-component Hangul characters in the group specified at the third specifying step can be specified at the fourth specifying step.

Since the maximum number of lax three-component Hangul characters in the group is nine, a lax three-component Hangul character can be specified through four keystrokes when the input device is provided with at least nine buttons. On the other hand, since the maximum number of un-lax three-component Hangul characters in the group is eighteen, an un-lax three-component Hangul character can be specified through five keystrokes when the input device is provided with at least nine buttons.

A Hangul character input method according to a second aspect of the present invention includes following three stages to solve the above-described problem.

At the first stage, nineteen varieties of initial sound components are divided into groups each of which includes two initial sound components at the maximum, and the groups are assigned to the buttons, respectively. The group of the initial sound component corresponding to the hit button can be specified.

At the second stage, twenty-one varieties of medium sound components are divided into groups each of which includes two medium sound components at the maximum, and each of the groups is assigned to each of the buttons. The group of the medium sound components corresponding to hit button is specified.

At the third stage, four varieties of two-component Hangul characters at the maximum that are combinations of the initial sound components specified at the first stage and the medium sound components specified at the second stage, groups of three-component Hangul characters consisting of the two-component Hangul characters with final sound components each of which has the same shape as a lax initial sound component, and groups of three-component Hangul characters consisting of the two-component Hangul characters with final sound components each of which has the same shape as an un-lax initial sound component are assigned to the buttons. When a button assigned to one of the two-component Hangul characters is hit, the corresponding two-component Hangul character is confirmed as an input character. When a button assigned to one of the groups is hit, the three-component Hangul characters in the group are assigned to the buttons. Then, when the button assigned to one of the three-component Hangul characters is hit, the corresponding three-component Hangul character is confirmed as an input character.

The Hangul character input method, the Hangul character input device and the Hangul character input program of the present invention can be applied to an information processing device having 12 buttons at least and 18 buttons at the maximum. Accordingly, all the initial-sound-component groups can be assigned to the buttons at the first stage, and all the medium-sound-component groups can be assigned to the buttons at the second stage. Order of the first stage and the second stage is out of the question. When the first and second stages have been completed by two keystrokes, an initial sound component group consisting of one or two initial sound components and a medium sound component group consisting of one or two medium sound components are determined, which specifies one through four candidates of two-component Hangul characters.

At the third stage, one through four candidates of the two-component Hangul characters, one through four candidate groups that include three-component Hangul characters consisting of the specified two-component Hangul characters and final sound components each of which has the same shape as a lax initial sound component, and one through four candidate groups that include three-component Hangul characters consisting of the specified two-component Hangul characters and final sound components each of which has a different shape from a lax initial sound component are listed. Since the maximum number of the candidates are twelve, all the candidates can be assigned to the twelve buttons. When the third keystroke selects a Hangul character candidate, the selected Hangul character is confirmed as an input target Hangul character. On the other hand, when the third keystroke selects a candidate group, the three-component Hangul characters included in the selected candidate group are assigned to the buttons as the next choices. Since nine Hangul character candidates at the maximum are included in each group that includes the three-component Hangul characters having the final sound components each of which has the same shape as a lax initial sound component, all the candidate can be assigned to the twelve buttons. When the fourth keystroke selects a three-component Hangul character candidate, the selected Hangul character candidate is confirmed as an input target Hangul character. On the other hand, since eighteen the Hangul character candidates at the maximum are included in each group that includes the three-component Hangul characters having the final sound components each of which has a different shape from a lax initial sound component, two keystrokes at the maximum allow to select a Hangul character. As far as the common Hangul characters, the maximum number of the three-component Hangul characters, which has the final sound components each of which has a different shape from a lax initial sound component, is eight for each group, which allows to select a common Hangul character by one keystroke.

As described above, when an input device has not more than 18 buttons, only three through five keystrokes (three or four keystrokes for the common Hangul characters) are required to confirm any Hangul character as an input target.

DESCRIPTION OF THE ACCOMPANYING DRAWINGS

FIG. 4 shows data structure of an initial sound component table;

FIG. 5 shows data structure of a medium sound component table;

FIG. 6 shows data structure of a Hangul character table;

FIG. 7 shows data structure of a lax three-component Hangul character dictionary;

FIG. 8 shows data structure of an un-lax three-component Hangul character dictionary;

FIG. 11 shows indication contents in the standard candidate display area at a second stage for selecting a medium sound component;

FIG. 12 shows initial indication contents of the standard candidate display area at a third stage for selecting a character;

Figure 14:
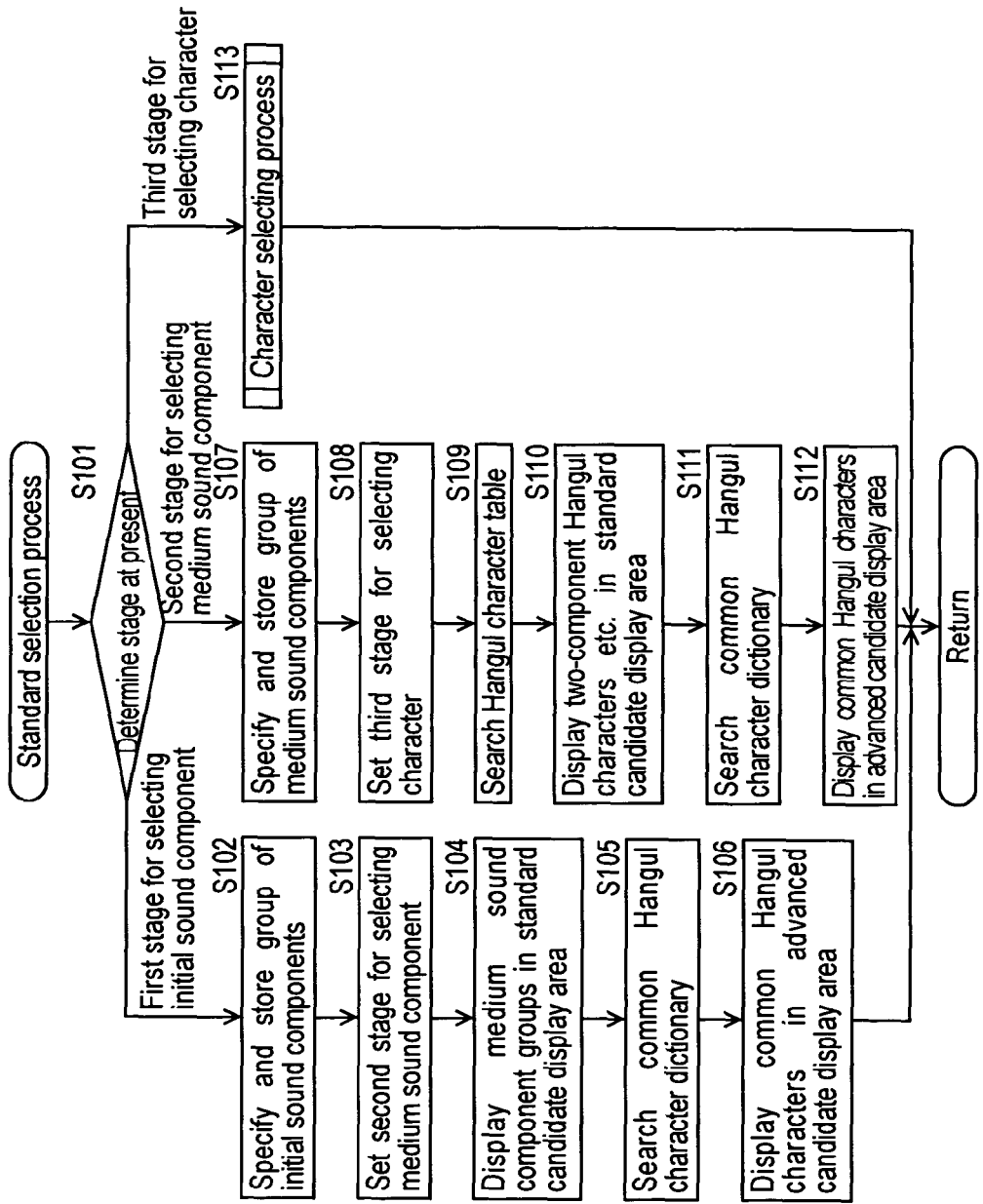
FIG. 14 is a flowchart showing a subroutine of a standard selecting process (subroutine) carried out at S006 of FIG. 13.
Figure 18:
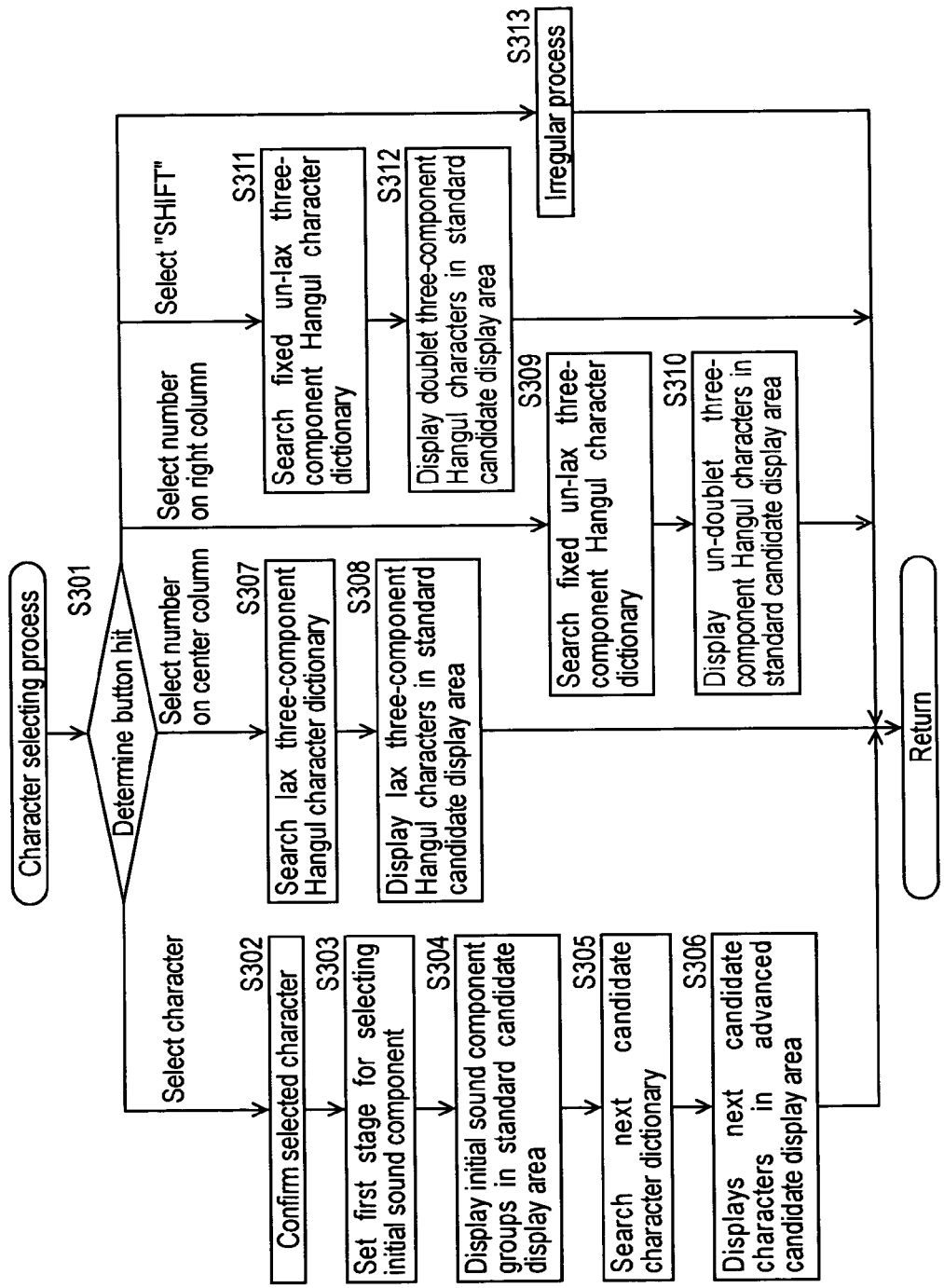

FIGS. 16*a* through 16*h* show changes of indication contents in a text display area and the standard candidate display area;

FIG. 17 shows data structure of a fixed un-lax three-component Hangul character dictionary of a second embodiment according to the present invention;

FIG. 18 is a flowchart showing a character selecting process (subroutine) of the second embodiment according to the present invention executed at S113 of FIG. 14;

FIGS. 19*a* through 19*f* show changes of indication contents in the text display area and the standard candidate display area;

FIG. 20 is a table of initial sound components;

FIG. 21 is a table of medium sound components;

FIG. 22 is a table of final sound components;

Figures 23, 24:
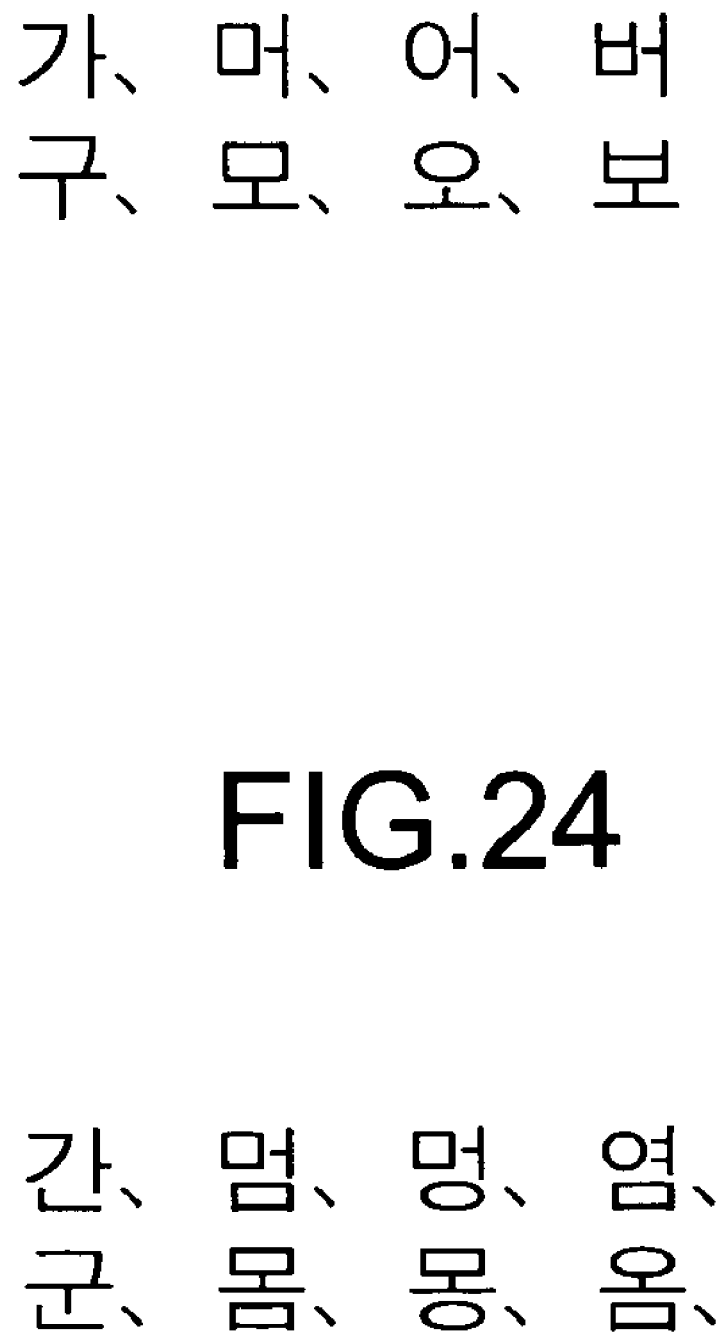

FIG. 23 shows examples of two-component Hangul characters; and

FIG. 24 shows examples of three-component Hangul characters.

DESCRIPTION OF THE PREFERRED EMBODIMENTS

Embodiments of the present invention will be described with reference to drawings.

FIRST EMBODIMENT

<Classification of Hangul Characters>

In a first embodiment of the present invention, three-component Hangul characters are classified into "lax three-component Hangul characters" that are combinations of two-component Hangul characters and final sound components each of which has the same shape as a lax initial sound component, and "un-lax three-component Hangul characters" that are combinations of two-component Hangul characters and final sound components each of which has a different shape from a lax initial sound component. In the second embodiment described later, "un-lax three-component Hangul characters" are classified into "doublet three-component Hangul characters" and "un-doublet three-component Hangul characters". Before the description of the concrete contents of the first embodiment, the above classification devised by the inventor of the present invention will be described.

Nineteen varieties of the initial sound components are divided into nine varieties of lax initial sound components, five varieties of aspirated initial sound components and five varieties of fortis initial sound components as shown in FIG. 20. In FIG. 20, the alphabet attached to each initial sound component shows pronunciation of the initial sound component. A fortis initial sound component is formed by arranging a pair of the same lax initial sound components side by side whose pronunciations are similar to the fortis initial sound component. In the following descriptions, the aspirated initial sound components and the fortis initial sound components are referred to as "un-lax sound components".

Further, twenty one verities of medium sound components are classified into ten varieties of Hangul components without semivowel, six varieties of Hangul components with semivowel "y" and five varieties of Hangul component with semivowel "w" as shown in FIG. 21. However, the embodiments do not use this classifications. In FIG. 21, the alphabet attached to each medium sound component shows pronunciation of the medium sound component.

Further, as shown in FIG. 22, the inventors of the present invention classified twenty seven varieties of final sound components into nine varieties of "lax final sound components" whose shapes are the same as the lax initial sound components and eighteen varieties of "un-lax final sound components". Moreover, the "un-lax final sound components" are classified into seven varieties of "un-doublet final sound components" whose shapes are identical to the un-lax initial sound components and eleven varieties of "doublet final sound components". In addition, a doublet final sound component is formed by arranging two components side-by-side selected from the lax initial sound components and the aspirated initial sound components.

As described above, since a two-component Hangul character, which do not include a final sound component, is a combination of one of nineteen varieties of the initial sound components and one of twenty one varieties of the medium sound components, there are 399 varieties of the two-component Hangul characters in theory. Further, since a three-component Hangul character is a combination of one of nineteen varieties of the initial sound components, one of twenty one varieties of the medium sound components and one of twenty seven varieties of the final sound components, there are 10,773 varieties of the three-component Hangul characters in theory.

The first embodiment of the present invention can input only 2,350 common Hangul characters that are prescribed by the Korean standard cord table KSC5601. According to the statistical analyses about combinations of initial, medium and final sound components constituting the common Hangul characters by the inventors of the present invention, it became evident that the number of the un-lax three-component Hangul characters that include the same combinations of initial and medium sound components is eight at the maximum. That is, when a combination of initial and medium sound components is specified, candidates are narrowed to one two-component Hangul character, nine lax three-component Hangul characters and eight un-lax three-component Hangul characters. Therefore, when a combination of initial and medium sound components is specified, two keystrokes at the maximum can specify one Hangul character. That is, the first keystroke selects one of the two-component Hangul character, the lax three-component Hangul character group and the un-lax three-component Hangul character group. The second keystroke selects one of the lax three-component Hangul characters or one of the un-lax three component Hangul characters.

Further, since nineteen varieties of the initial sound components are divided into at least ten groups each of which contains two initial sound component at the maximum and twenty one varieties of the medium sound components are divided into at least eleven groups (twelve groups in the first embodiment) each of which contains two medium sound components at the maximum, two keystrokes can narrow candidates to four combinations of the initial and medium sound components. When the four combinations of the initial and medium sound components are specified, a total number of the choices of the above described becomes 12(=3×4), which enables the input device having twelve buttons to select an choice by one keystroke.

According to the first embodiment, a two-component Hangul character can be selected by three keystrokes. That is, a first keystroke narrows the initial sound components to two components, a second keystroke narrows the medium sound components to two components and a third keystroke selects one of two-component Hangul characters from four combinations at the maximum. Further, a three-component Hangul character can be selected by four keystrokes. The first and second keystrokes are identical to the case to select the two-component Hangul character. A third keystroke selects one of the groups of the lax three-component Hangul character and the groups of the un-lax three-component Hangul character. A fourth keystroke selects one three-component Hangul character from the characters included in the group selected by the third keystroke. Besides, the maximum number of choices is 12, an input device having only twelve buttons is available.

<Construction of Cellular Phone>

Figure 1:
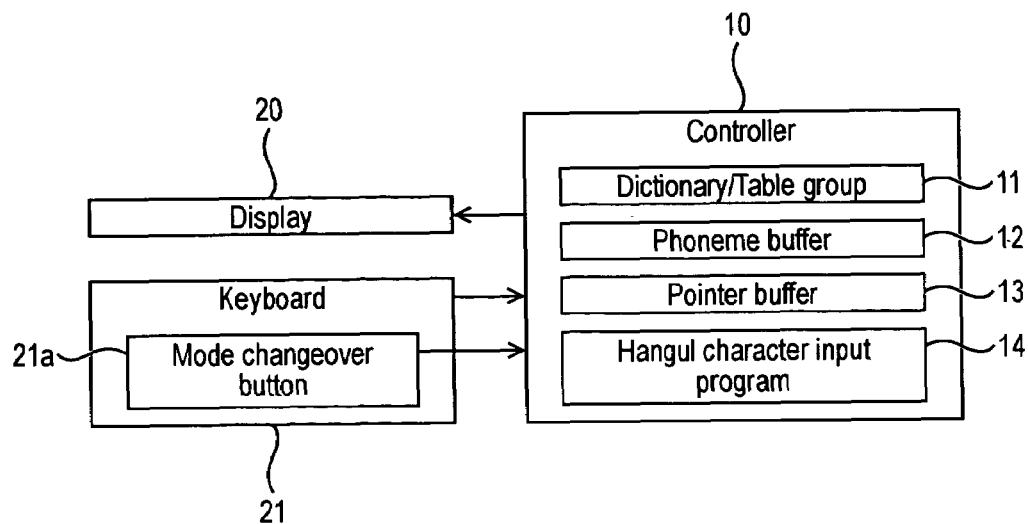
FIG. 1 is a block diagram showing construction of a cellular phone in which a Hangul character input device of a first embodiment according to the present invention is installed.
Figure 2:
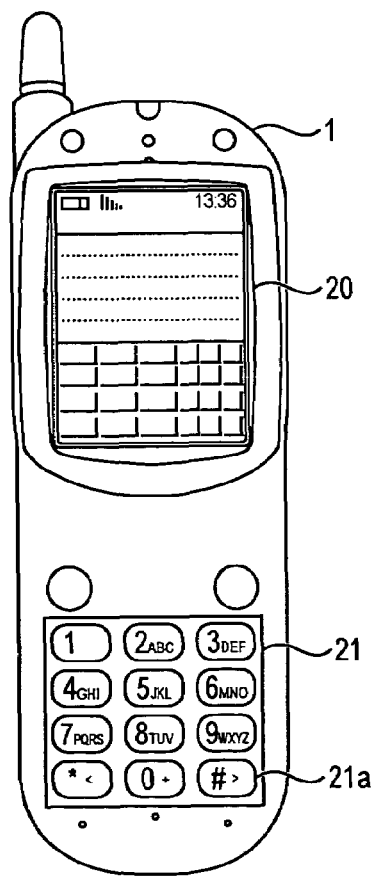
FIG. 2 is a plan view showing an appearance of the cellular phone.

Hereinafter, a construction of a cellular phone 1 will be described. The cellular phone 1 is an information processing device in which the Hangul character input device is installed for executing the Hangul character input method of the first embodiment according to the present invention. FIG. 2 is a plan view showing an appearance of the cellular phone 1 and FIG. 1 is a block diagram showing construction therein. The cellular phone 1 of the embodiment includes a controller (a computer) 10, a display 20 and a keyboard 21 as an input device that are connected to the controller 10 as shown in FIG. 1. Although FIG. 1 shows the parts corresponding to the Hangul character input device in the cellular phone 1 only, the cellular phone 1 has various parts (not shown) to perform normal functions (a radio call function, a radio mail transmission and reception function) are built therein.

The display 20 is a rectangular liquid crystal display (and its drive circuit) installed in the cellular phone 1 and the display 20 is controlled by the controller 10 to show various images including Hangul characters, alphanumeric characters and symbols.

The keyboard 21 has twelve buttons in total. That is, the keyboard 21 includes a ten-digit keypad having ten buttons on which numerals "0" through "9" are printed, respectively, an asterisk button on which a symbol "*" is printed and a sharp button on which a symbol "#" is printed. When any button is hit, an identifying signal of the hit button is input into the controller 10. Further the sharp button 21*a* may act as a mode changeover button that changes an input mode among a telephone number input mode (one numeral is input by one keystroke), an alphanumeric character input mode (one character is confirmed and input by two keystrokes) and a Hangul character input mode with control by the controller 10. Specifically, the sharp button 21*a* is used as the mode changeover button at a first stage 14*a* for selecting an initial sound component in the Hangul character input mode, in the telephone number input mode and in the alphanumeric character input mode. On the other hand, the sharp button 21*a* is not used as the mode changeover button at a second stage 14*b* for selecting a medium sound component and a third stage 14*c* for selecting character in the Hangul character input mode.

The controller 10 is provided with a dictionary/table groups 11, a phoneme buffer 12, a pointer buffer 13 and a Hangul character input program 14. The dictionary/table groups 11 and the Hangul character input program 14 are stored in a ROM (Read Only Memory, not shown). The phoneme buffer 12 and the pointer buffer 13 are developed on a RAM (Random Access Memory, not shown). Further, the Hangul character input program 14 is executed by a CPU (Central Processing Unit, not shown).

Figure 3:
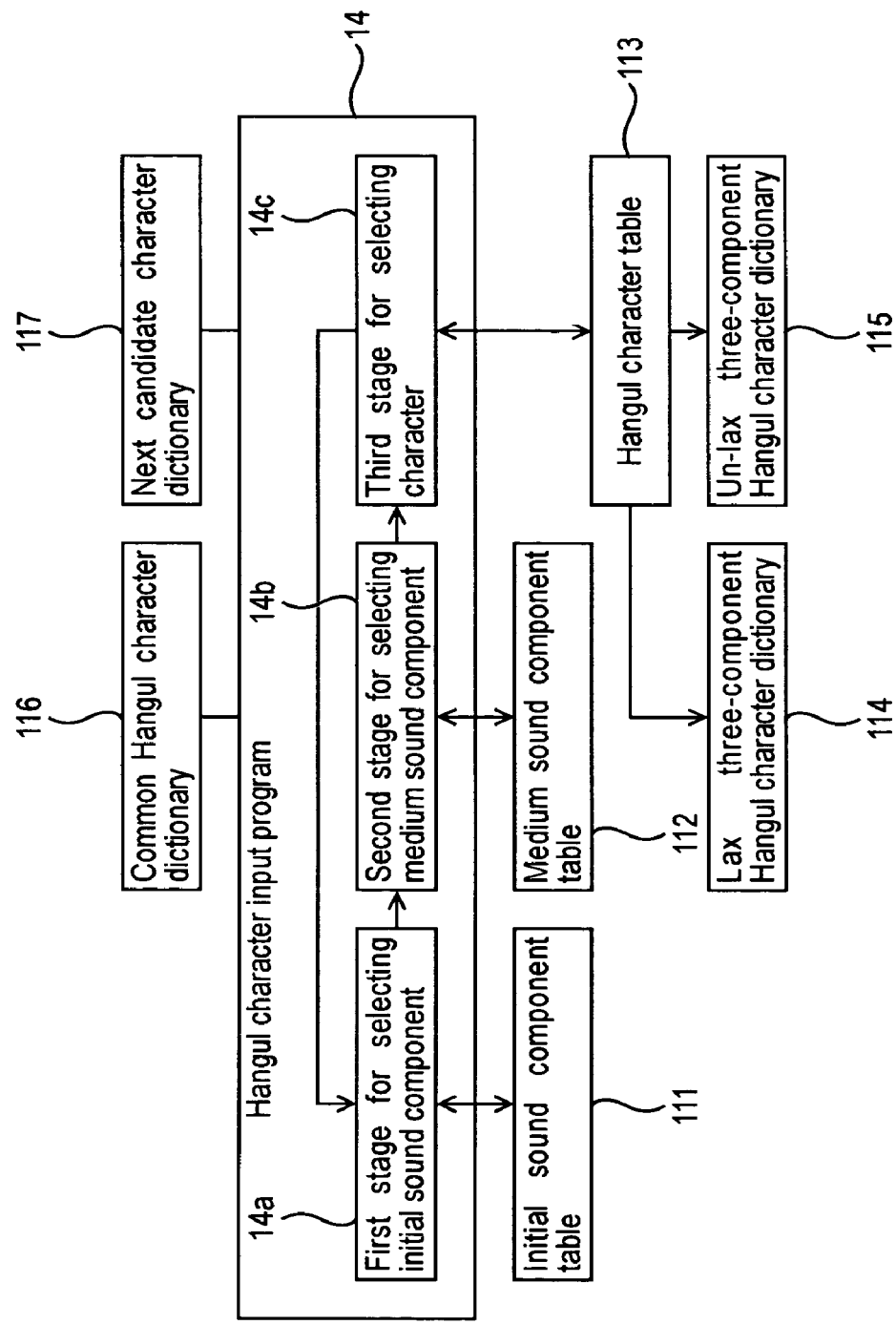
FIG. 3 is a block diagram showing software construction of a Hangul character input program, various tables and dictionaries.

As shown in FIG. 3, an initial sound component table 111, a medium sound component table 112, a Hangul character table 113, a lax three-component Hangul character dictionary 114, an un-lax three-component Hangul character dictionary 115, a common Hangul character dictionary 116 and a next candidate character dictionary 117 are included in the dictionary/table groups 11 stored in the ROM of the controller 10.

The initial sound component table 111 as a first table (a first memory) consists of records each of which includes a "Button" field indicating the identification of a button of the ten-digit keypad of the keyboard 21 and a "Candidate" field showing a group including one or two initial sound component assigned to each button as shown in FIG. 4.

The medium sound component table 112 as a second table (a second memory) consists of records each of which includes a "Button" field indicating the identification of a button of the ten-digit keypad, the asterisk button or the sharp button of the keyboard 21 and a "Candidate" field showing one or two medium sound component assigned to each button as shown in FIG. 5.

Figure 6:
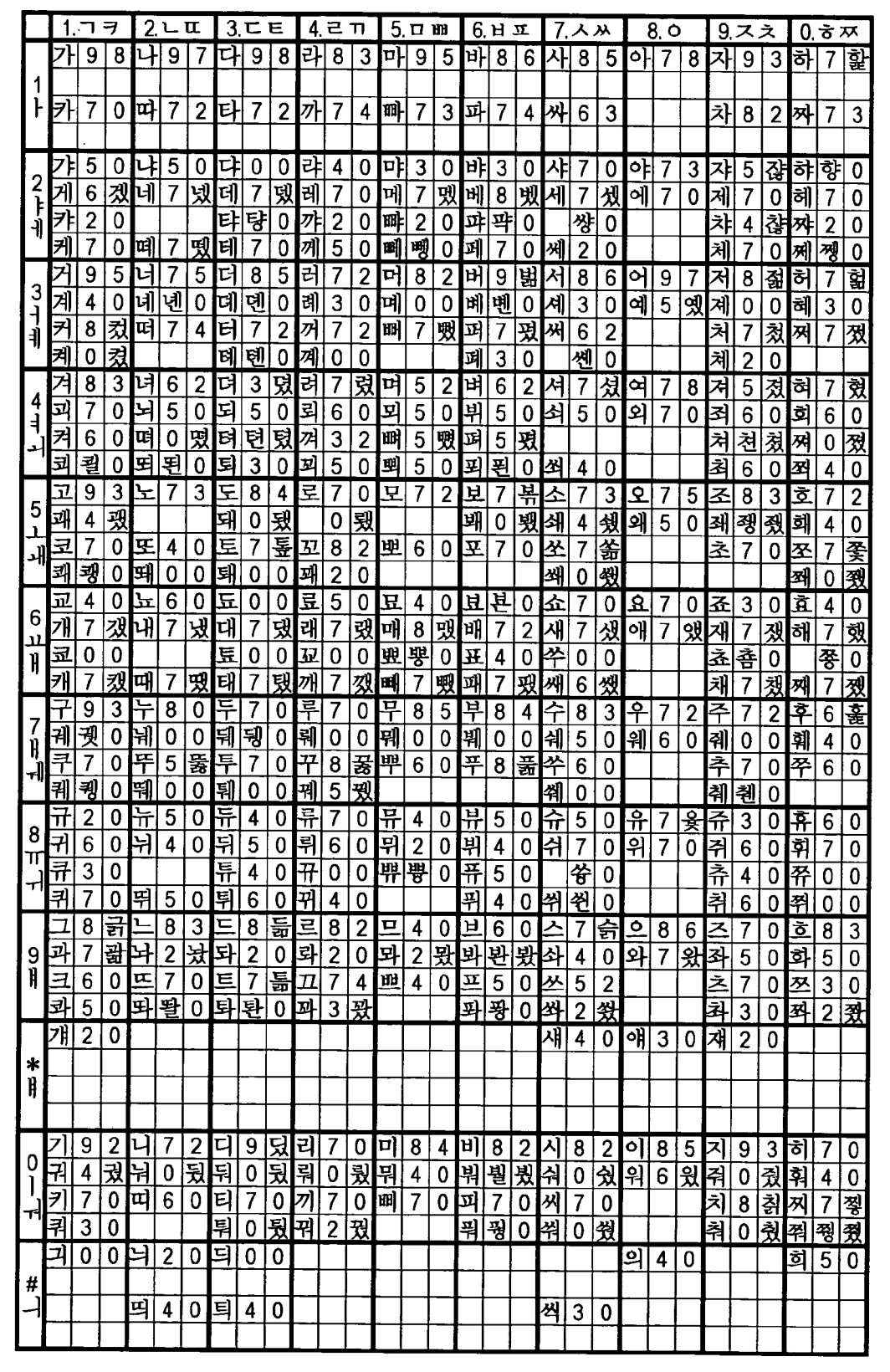

The Hangul character table 113 as a third table (a third memory) is a three dimensional table. A first dimension shows array elements corresponding to each record of the initial sound component table 111, a second dimension shows array elements corresponding to each record of the medium sound component table 112 and a third dimension shows contents of a record. In FIG. 6, a horizontal axis defines the array elements of the first dimension and a vertical axis defines the array elements of the second dimension. A grid surrounded by bold lines specified by the array element on the horizontal axis and the array element on the vertical axis shows a record as an array element of the third dimension. Each record (grid) forms twelve segments (4×3 matrix) divided by thin lines in FIG. 6. Each segment of the matrix corresponds to a position of each button of the keyboard 21 and a character or the number assigned to the button is indicated in each segment. Specifically, four varieties of two-component Hangul characters at the maximum, which are specified by combinations of one or two initial sound components as the array elements of the first dimension and one or two medium sound components as the array elements of the second dimension, are assigned to the buttons of the left column ("1", "4", "7" and "*" buttons) Lax three-component Hangul characters each of which is combination of the two-component Hangul character assigned to the button of the left column in the same row and a lax final sound component are assigned to the buttons of the center column ("2", "5", "8" and "0" buttons) when there is single lax three-component Hangul character for each row. When there are a plurality of lax three-component Hangul characters for each row, numbers of the characters, which correspond to symbols representing groups of lax three-component Hangul characters, are assigned to the buttons of the center column. Un-lax three-component Hangul characters each of which is combination of the two-component Hangul character assigned to the button of the left column in the same row and an un-lax final sound component are assigned to the buttons of the right column ("3", "6", "9" and "#" buttons) when there is single un-lax three-component Hangul character for each row. When there are a plurality of un-lax three-component Hangul characters for each row, numbers of the characters, which correspond to symbols representing groups of un-lax three-component Hangul characters, are assigned to the buttons of the right column.

The lax three-component Hangul character dictionary 114 as a fourth table (a fourth memory, a three-component Hangul character table, a lax three-component Hangul character table) consists of records each of which includes all of lax three-component Hangul components consisting of a two-component Hangul character and the respective lax final sound components. FIG. 7 shows a part of the dictionary 114. The three-component Hangul characters in a record are arranged in the order of the lax final sound components (i.e., in the order of the buttons of the ten-digit keypad to which the lax three-component Hangul characters are assigned).

The un-lax three-component Hangul character dictionary 115 as a fifth table (a fifth memory, a three-component Hangul character table, an un-lax three-component Hangul character table) consists of records each of which includes all of un-lax three-component Hangul components consisting of a two-component Hangul character and the respective un-lax final sound components. FIG. 8 shows a part of the dictionary 115.

Further, the common Hangul character dictionary 116 is the table that defines frequency of use of each common Hangul character.

The next candidate character dictionary 117 is the table that defines Hangul characters that are frequently used to follow a context formed by Hangul character string that has already input.

On the other hand, the Hangul character input program 14 causes the controller 10 to perform a first stage 14a for selecting initial sound components (a process as a first means to narrow the initial sound components to two components), a second stage 14b for selecting medium sound components (a process as a second means to narrow the medium sound components to two components) and a third stage 14c for selecting a character (a process as a third means to select one of two-component Hangul characters that are combinations of the initial sound components narrowed at the first stage 14a and the medium sound components narrowed at the second stage 14b, the lax three-component Hangul characters or the un-lax three-component Hangul characters) in this order as shown in FIG. 3.

The phoneme buffer 12 is a memory region to record a history of keystrokes on the keyboard 21 in the Hangul character input mode and the alphanumeric character input mode. When a predetermined back key is operated, the process can go back to the previous stage with the history.

The pointer buffer 13 is a memory region to record a current stage that is performed at present in the Hangul character input mode.

When an operator makes a phone call, the display 20 works in the telephone number input mode to indicate an input numeral string as a phone number of the other end. In the telephone number input mode, a numeral is confirmed and input by one keystroke of the den-digit keypad of the keyboard 21. Further, when an operator creates an e-mail, an address book or a schedule book, the display 20 works in the Hangul character input mode or the alphanumeric character input mode. In the alphanumeric character input mode, the entire area of the display 20 becomes a text display area. An alphanumeric character is confirmed by two keystrokes of the same button of the keyboard 21 and is indicated at the end of the character string that has already input.

Figures 9, 10:
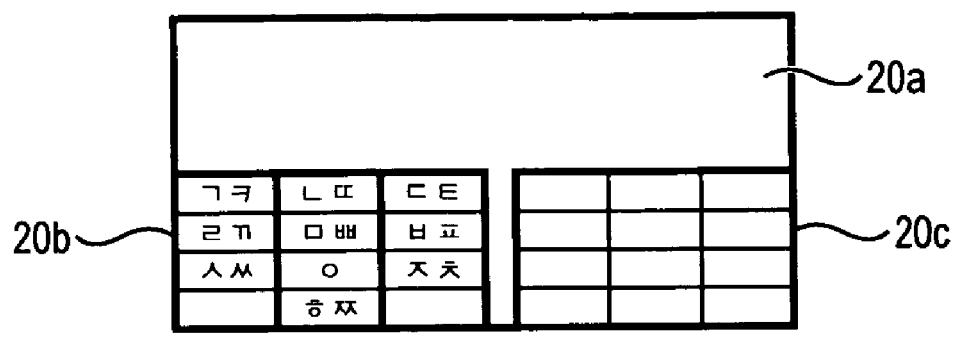
FIG. 9 shows a screen of a display in a Hangul character input mode.
FIG. 10 shows indication contents in a standard candidate display area at a first stage for selecting an initial sound component.

In the Hangul character input mode, an upper half of the display 20 becomes a text indication area 20a as shown in FIG. 9. The lower left area becomes a standard candidate display area 20b and the lower right area becomes an advanced candidate display area 20c. The standard candidate display area 20b and the advanced candidate display area 20c are divided into twelve segments (4×3 matrix), respectively, corresponding to the buttons of the keyboard 21.

In the standard candidate display area 20b, candidates assigned to the buttons of the keyboard 21 are listed at the stages 14a, 14b and 14c of the Hangul character input program 14. The candidates include sound components, numbers and Hangul characters defined in the initial sound component table 111, the medium sound component table 112, the Hangul character table 113, the lax three-component Hangul character dictionary 114 and the un-lax three-component Hangul character dictionary 115. Specifically, as shown in FIG. 10, ten groups including nineteen varieties of initial sound components are listed in the standard candidate display area 20b based on the definition of the initial sound component table 111 at the first stage 14a for selecting an initial sound component. As shown in FIG. 11, twelve groups including twenty-one varieties of medium sound components are listed in the standard candidate display area 20b based on the definition of the medium sound component table 112 at the second stage 14b for selecting a medium sound component. As shown in FIG. 12, four varieties of two-component Hangul characters at the maximum, which are specified by combinations of one or two initial sound components selected at the first stage 14a and one or two medium sound components selected at the second stage 14b, a lax three-component Hangul character that is a combination of the two-component Hangul character and a lax final sound component or the number of lax three-component Hangul characters that are combinations of the two-component Hangul character and lax final sound components, and an un-lax three-component Hangul character that is a combination of the two-component Hangul character and an un-lax final sound component or the number of un-lax three-component Hangul characters that are combinations of the two-component Hangul character and un-lax final sound components are listed in the standard candidate display area 20b based on the Hangul character table 113 at the third stage 14c for selecting a character. When any number is selected, nine lax three-component Hangul characters at the maximum or eight un-lax three-component Hangul characters at the maximum corresponding to the selected number are listed in the standard candidate display area 20b.

Further, a confirmed Hangul character string and one or two initial sound components selected at the first stage 14a are indicated in the text display area 20a.

Furthermore, Hangul characters that are frequently used to follow a context formed by input Hangul character string (Hangul characters retrieved from the next candidate character dictionary 117), frequently used Hangul characters that include the initial sound component(s) selected at the first stage 14a (Hangul characters retrieved from the common Hangul character dictionary 116) or frequently used Hangul characters that include the combination(s) of the initial sound component(s) selected at the first stage 14a and the medium sound component(s) selected at the second stage 14b (Hangul characters retrieved from the common Hangul character dictionary 116) are assigned to the buttons of the keyboard 21 and indicated in the advanced candidate display area 20c.

A candidate indicated in the standard candidate display area 20b will be selected by a short keystroke of the corresponding button of the keyboard 21. On the other hand, a candidate indicated in the advanced candidate display area 20c will be selected by a long keystroke of the corresponding button of the keyboard 21. The short and long keystrokes are distinguished by comparing time of the keystroke with a predetermined reference time.

<Processing Contents of Hangul Character Input Program>

Hereinafter, processing contents performed by the controller 10 according to the Hangul character input program 14 will be described with reference to FIG. 13 through FIG. 15. When an operator hits the sharp button 21a (the mode changeover button) in the mode other than the Hangul character input mode, the mode changes to the Hangul character input mode, which starts the process of the Hangul character input program 14. When an operator hits the sharp button 21a while the sharp button 21a acts as the mode changeover button in the Hangul character input mode, the mode changes to the other mode, which terminates the process of the Hangul character input program 14.

The controller 10 can recognize which of the first stage 14a for selecting the initial sound component, the second stage 14b for selecting the medium sound component and the third stage 14c for selecting the character is performed at present by referring the pointer buffer 13. That is, if "NULL" is recorded in the pointer buffer 13, the controller 10 determines that the first stage 14a for selecting the initial sound component is performed. If a value defined in the "Button" field of the initial sound component table 111 (referred to as a "button value" in the followings) is recorded in the pointer buffer 13, the controller 10 determines that the second stage 14b for selecting the medium sound component is performed. If a value defined in the "Button" field (a button value) of the medium sound component table 112 is recorded in the pointer buffer 13, the controller 10 determines that the third stage 14c for selecting the character is performed.

At a first step S001, the controller 10 resets a value recorded in the pointer buffer 13 to "NULL" to set the input stage at the first stage 14a for selecting an initial sound component.

At S002, the controller 10 displays ten groups including nineteen varieties of initial sound components in the standard candidate display area 20b of the display 20 with reference to the initial sound component table 111. The respective groups are indicated at the segments in the area 20b that represent the buttons to which the respective groups are assigned. Then, indications in the standard candidate display area 20b are replaced as shown in FIG. 10.

At S003, the controller 10 lists twelve varieties of the most common Hangul characters in the advanced candidate display area 20c of the display 20 in the order of frequency of use with reference to the common Hangul character dictionary 116.

At S004, the controller 10 waits for a keystroke of any button of the keyboard 21. Detecting a keystroke, the controller 10 brings the process to S005.

At S005, the controller 10 determines whether the keystroke is a short keystroke for selecting a candidate indicated in the standard candidate display area 20b or another keystroke (a long keystroke for selecting a common Hangul character indicated in the advanced candidate display area 20c, a keystroke of the sharp button that acts as the mode changeover button or a keystroke of another button). In the case of the short keystroke, the controller 10 brings the process to S006, otherwise to S007.

At S006, the controller 10 executes a standard selecting process. FIG. 14 is a flowchart to show the standard selecting process (subroutine) executed at S006. At a first step S101 of the subroutine, the controller 10 determines which of the first stage 14a for selecting the initial sound component, the second stage 14b for selecting the medium sound component and the third stage 14c for selecting the character is performed at present by referring the pointer buffer 13. Then the controller 10 brings the process to S102 in the case of the first stage 14a, to S107 in the case of the second stage 14b or to S113 in the case of the third stage 14c.

At the time of execution of S102, ten groups including nineteen varieties of initial sound components defined in the initial sound component table 111 (FIG. 4) are displayed in the standard candidate display area 20b of the display 20 as a result of the process at S002 or S010. Then, the controller 10 specifies a button of the keyboard 21 hit by an operator. In other words, the controller 10 specifies the record in the initial sound component table 111 (FIG. 4) selected by the operator. The controller 10 stores the group of the initial sound component recorded in the "Candidate" field of the specified record into the phoneme buffer 21, displaying the components in the group in the text display area 20a of the display 20.

At S103, the controller 10 stores the value of the "Button" field of the record of the initial sound component table 111 (FIG. 4) specified at S102 into the pointer buffer 13, setting an input stage at the second stage 14b for selecting the medium sound component.

At S104, the controller 10 displays twelve groups including twenty-one varieties of the medium sound components at respective segments representing assigned buttons in the standard candidate display area 20b of the display 20 with reference to the medium sound component table 112. Then, indications in the standard candidate display area 20b are replaced as shown in FIG. 11.

At S105, the controller 10 searches the common Hangul character dictionary 116 to extract twelve common Hangul characters that are most frequently used among common Hangul characters including the initial sound component(s) in the group specified at S102.

At S106, the controller 10 displays the twelve common Hangul characters extracted from the common Hangul character dictionary 116 at S105 in the advanced candidate display area 20c of the display 20 as the next candidates. When the process at S106 is completed, the controller 10 finishes the standard selecting process (subroutine), returning the process to S004 in the main routine shown in FIG. 13.

On the other hand, at the time of execution of S107, twelve groups including twenty-one varieties of medium sound components defined in the medium sound component table 112 (FIG. 5) are displayed in the standard candidate display area 20b of the display 20 as a result of the process at S104. Then, the controller 10 specifies a button of the keyboard 21 hit by the operator. In other words, the controller 10 specifies a record in the medium sound component table 112 (FIG. 5) selected by the operator. The controller 10 stores the group of the medium sound component(s) recorded in the "Candidate" field of the specified record into the phoneme buffer 21 and clears the initial sound component group displayed in the text display area 20a of the display 20.

At S108, the controller 10 stores the value of the "Button" field of the record of the medium sound component table 112 (FIG. 5) specified at S107 into the pointer buffer 13, setting an input stage at the third stage 14c for selecting a character.

At S109, the controller 10 searches the Hangul character table 113 with the value of the "Button" field of the initial sound component table 111 (FIG. 4) and the value of the "Button" field of the medium sound component table 112 (FIG. 5) recorded in the pointer buffer 13 to extract records corresponding to the "Button" values. That is, four varieties of two-component Hangul characters at the maximum, lax three-component Hangul characters or the numbers thereof and un-lax three-component Hangul characters or the numbers thereof are extracted.

At S110, the controller 10 displays the elements of the record extracted at S109 at respective segments representing the assigned buttons in the standard candidate display area 20b of the display 20. Then, indications in the standard candidate display area 20b are replaced as shown in FIG. 12, for example.

At S111, the controller 10 searches the common Hangul character dictionary 116 to extract twelve common Hangul characters that are most frequently used among the common Hangul characters including combinations of the initial sound components of the group in the initial sound component table 111 (FIG. 4) corresponding to the value of "Button" field stored in the pointer buffer 13 and the medium sound components of the group in the medium sound component table 112 (FIG. 5) corresponding to the value of "Button" field stored in the pointer buffer 13.

At S112, the controller 10 displays twelve varieties of the common Hangul characters extracted from the common Hangul character dictionary 116 at Sill in the advanced candidate display area 20c of the display 20 as the next candidates. When the process at S112 is completed, the controller 10 finishes the standard selecting process (subroutine), returning the process to S004 in the main routine shown in FIG. 13.

On the other hand, at the time of execution of S113, the contents of the records extracted from Hangul character table 113 (FIG. 6) at S110 (four varieties of two-component Hangul characters at the maximum, lax three-component Hangul characters or the numbers thereof and un-lax three-component Hangul characters or the numbers thereof) are displayed in the standard candidate display area 20b of the display 20. Alternatively, nine varieties of lax three-component Hangul characters at the maximum extracted from the lax three-component Hangul character dictionary 114 at S208 or eight varieties of un-lax three-component Hangul characters at the maximum extracted from the un-lax three-component Hangul character dictionary 115 may be displayed in the standard candidate display area 20b. Then, the controller 10 executes a character selecting process.

Figure 15:
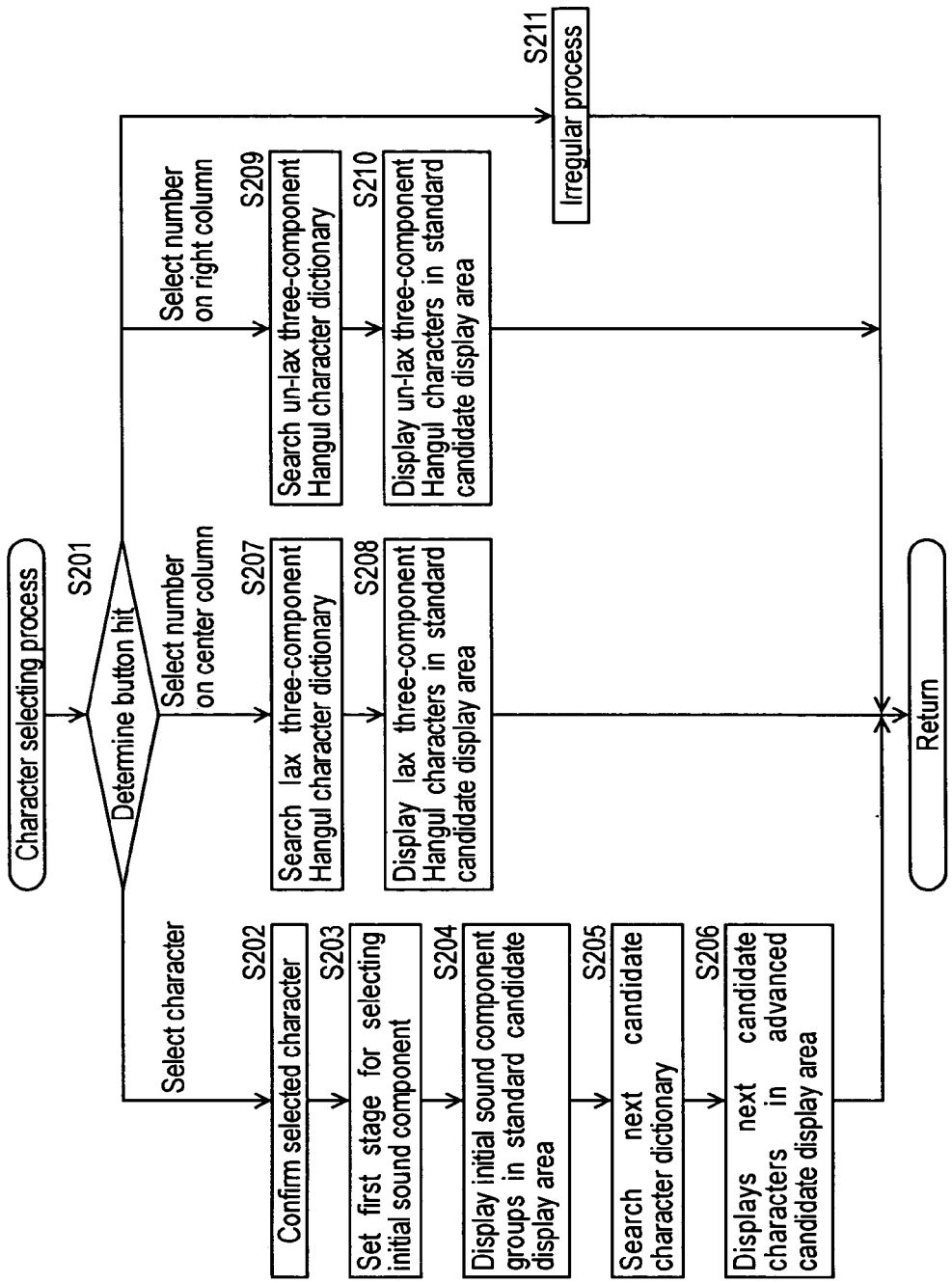
FIG. 15 is a flowchart showing a character selecting process (subroutine) executed at S113 of FIG. 14.

FIG. 15 is a flowchart showing the character selecting process (subroutine) executed at S113. At a first step S201 of the subroutine, the controller 10 determines a button hit by the operator. Then, the controller 10 brings the process to S202 when the button assigned to any Hangul character (a two-component Hangul character, a lax three-component Hangul character or an un-lax three-component Hangul character displayed at S110, a lax three-component Hangul character displayed at S208 or an un-lax three-component Hangul character displayed at S210) is hit. When a button assigned to the number (except "0") on the center column displayed at S110 is hit, the controller 10 brings the process to S207. When a button assigned to the number (except "0") on the right column displayed at S110 is hit, the controller 10 brings the process to S209. On the other hand, when a button as signed to the number "0" displayed at S110 is hit, the controller 10 brings the process to S211.

At S202, the controller 10 extracts the Hangul character assigned to the hit button from the Hangul character table 113, the lax three-component Hangul character dictionary 114 or the un-lax three-component Hangul character dictionary 115, confirming the extracted Hangul character by storing it into the phoneme buffer 21. At the same time, the controller 10 displays the extracted Hangul character at the end of the input character string in the text display area 20a of the display 20.

At S203, the controller 10 resets a value recorded in the pointer buffer 13 to "NULL" to set the input stage at the first stage 14a for selecting an initial sound component.

At S204, the controller 10 displays ten groups including nineteen varieties of initial sound components at segments representing the assigned buttons in the standard candidate display area 20b of the display 20 with reference to the initial sound component table 111. Then, indications in the standard candidate display area 20b are replaced as shown in FIG. 10.

At S205, the controller 10 searches the next candidate character dictionary 117 based on the character string displayed in the text display area 20a to extract twelve varieties of Hangul characters that are most frequently used to follow a context formed by the input Hangul character string.

At S206, the controller 10 displays twelve varieties of the common Hangul characters extracted from the next candidate character dictionary 117 at S205 in the advanced candidate display area 20c of the display 20 as the next candidates. When the process at S206 is completed, the controller 10 finishes the character selecting process (subroutine) and the standard selecting process (subroutine), returning the process to S004 in the main routine shown in FIG. 13.

On the other hand, at S207, the controller 10 searches the lax three-component Hangul character dictionary 114 based on the two-component Hangul character displayed on the left column in the same row as the number assigned to the hit button in the standard candidate display area 20b to extract the lax three-component Hangul characters that are combinations of the two-component Hangul character and the lax final sound components.

At S208, the controller 10 displays the lax three-component Hangul characters extracted at S207 at the segments corresponding to the buttons of the ten-digit keypad representing the final sound components included in the extracted characters in the standard candidate display area 20b of the display 20. When the process at S208 is completed, the controller 10 finishes the character selecting process (subroutine) and the standard selecting process (subroutine), returning the process to S004 in the main routine shown in FIG. 13.

On the other hand, at S209, the controller 10 searches the un-lax three-component Hangul character dictionary 115 based on the two-component Hangul character displayed on the left column in the same row as the number assigned to the hit button in the standard candidate display area 20*b* to extract the un-lax three-component Hangul characters that are combinations of the two-component Hangul character and the un-lax final sound components.

At S210, the controller 10 displays the un-lax three-component Hangul characters extracted at S209 in the standard candidate display area 20*b* of the display 20. When the process at S210 is completed, the controller 10 finishes the character selecting process (subroutine) and the standard selecting process (subroutine), returning the process to S004 in the main routine shown in FIG. 13.

Figure 13:
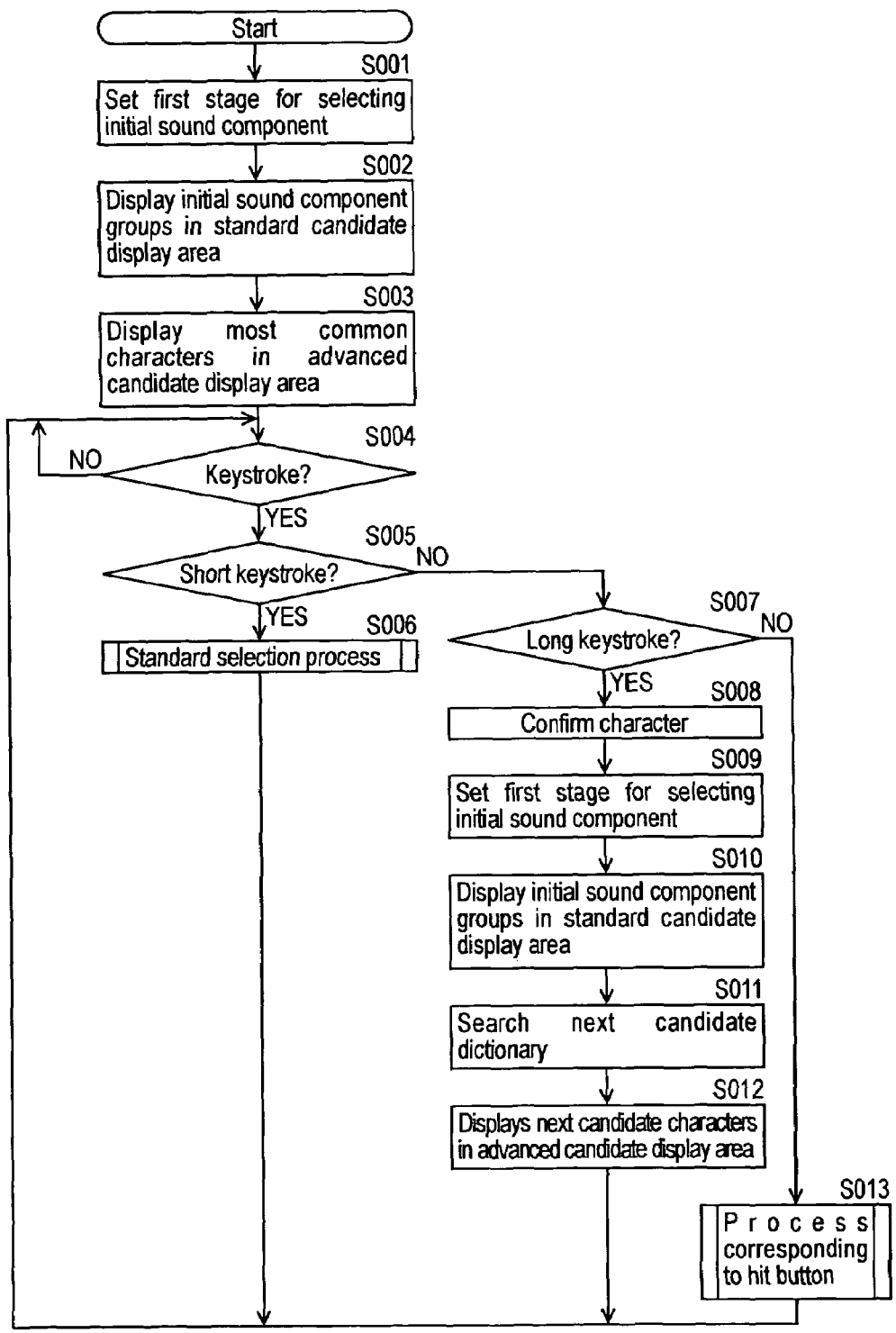
FIG. 13 is a flowchart showing process contents of a CPU according to the Hangul character input program.

On the other hand, at S211 (irregular process), the controller 10 finishes the character selecting process (subroutine) and the standard selecting process (subroutine) without executing a process corresponding to the hit button, returning the process to S004 in the main routine of FIG. 13.

When the keystroke by the operator does not select a choice displayed in the standard candidate display area 20*b*, the controller 10 determines whether the keystroke is for selection of a common Hangul character displayed in the advanced candidate display area 20*c* or for other actions (keystroke of the sharp button 21*a* when the button 21*a* acts as the mode changeover button or keystroke of the other button) at S007. When the keystroke is for selection of a common Hangul character displayed in the advanced candidate display area 20*c*, the controller 10 brings the process to S008. If the keystroke is for other actions, the controller 10 brings the process to S013.

At S008, the controller 10 extracts a common Hangul character that is displayed at the segment assigned to the hit button in the advanced candidate display area 20*c* from the common Hangul character dictionary 116 or the next candidate character dictionary 117, confirming the extracted common Hangul character by storing it into the phoneme buffer 21. At the same time, the controller 10 displays the extracted common Hangul character at the end of input character string in the text display area 20*a* of the display 20.

At S009, the controller 10 resets the value recorded in the pointer buffer 13 to "NULL" to set the input stage at the first stage 14*a* for selecting an initial sound component.

At S010, the controller 10 displays ten groups including nineteen varieties of initial sound components in the standard candidate display area 20*b* of the display 20 with reference to the initial sound component table 111. The respective groups are indicated at the segments in the area 20*b* that represent the buttons to which the respective groups are assigned. Then, indications in the standard candidate display area 20*b* are replaced as shown in FIG. 10.

At S011, the controller 10 searches the next candidate character dictionary 117 based on the character string displayed in the text display area 20*a* to extract twelve varieties of Hangul characters that are most frequently used to follow a context formed by the input Hangul character string.

At S012, the controller 10 displays twelve varieties of the common Hangul characters extracted from the next candidate character dictionary 117 at S011 in the advanced candidate display area 20*c* of the display 20 as the next candidates. Finishing the process at S012, the controller 10 returns the process back to S004.

On the other hand, at S013, the controller 10 executes a process corresponding to the hit button. For example, when the sharp button 21*a* is hit during operation as the mode switchover button, the controller 10 executes the process for changing the mode. Finishing the process at S013, the controller 10 returns the process back to S004.

In the same manner, the controller 10 sequentially confirms the input Hangul characters according to keystrokes on the respective buttons of the keyboard 21 by the operator, displaying the confirmed Hangul characters in the text display area 20*a* until the mode is changed at S013.

<Hangul Character Input Method>

A process to input Hangul character string that means "a telephone" according to the first embodiment will be described with reference to FIG. 16*a* through FIG. 16*h*. FIG. 16*a* through FIG. 16*h* show changes of indication contents in the standard candidate display area 20*b* and the text display area 20*a* at respective steps to input the Hangul character string. In FIG. 16*a* through FIG. 16*h*, indication contents in the advanced candidate display area 20*c* are omitted.

When the input mode of the cellular phone is changed to the Hangul character input mode under the condition where no characters are displayed in the text display area 20*a*, "NULL" is set in the pointer buffer 13 to set the input stage at the first stage 14*a* for selecting an initial sound component (S001). Then, ten groups including nineteen varieties of initial sound components are displayed in the standard candidate display area 20*b* according to the definition of the initial sound component table 111 as shown in FIG. 16*a* (S002). The respective groups are indicated at the segments in the area 20*b* that represent the buttons of the ten-digit keypad of the keyboard 21 to which the respective groups are assigned.

When an operator hits the "9" button of the ten-digit keypad (S004), the initial sound component group assigned to the "9" button in the initial sound component table 111 is selected (S005, S006, S101 and S102). That is, the two initial sound components displayed at the shaded segment in FIG. 16*a* are selected. The button value input at S004 is stored in the pointer buffer 13 to set the input stage at the second stage 14*b* for selecting a medium sound component (S103). Then, the selected two initial sound components are displayed in the text display area 20*a* and twelve groups including twenty-one varieties of medium sound components are displayed in the standard candidate display area 20*b* according to the definition of the medium sound component table 112 as shown in FIG. 16*b* (S104). The respective groups are indicated at the segments in the area 20*b* that correspond to the buttons of the ten-digit keypad, the asterisk button and the sharp button of the keyboard 21 to which the respective groups are assigned.

When the operator hits the "3" button of the ten-digit keypad (S004), the medium sound component group assigned to the "3" button in the medium sound component table 112 is selected (S005, S006, S101 and S107). That is, the two medium sound components displayed at the shaded segment in FIG. 16*b* are selected. At the present, neither an initial sound component nor a medium sound component has been confirmed.

The button value input at S004 is stored in the pointer buffer 13 to set the input stage at the third stage 14*c* for selecting a character (S108). Then, the two initial sound components displayed in the text display area 20*a* are cleared and the contents of the record extracted from the Hangul character table 113 corresponding to the button value "9" for the initial sound component and the button value "3" for the medium sound component are displayed in the standard candidate display area 20b (S109, S110) as shown in FIG. 16c. The respective contents are indicated at the segments in the area 20b that correspond to the buttons of the ten-digit keypad, the asterisk button and the sharp button of the keyboard 21 to which the respective contents are assigned. Four varieties of two-component Hangul characters, which are combinations of the two initial sound components selected and the two medium sound components selected, are indicated at the segments assigned to the buttons of the left column ("1", "4", "7" and "*" buttons) in the standard candidate display area 20b. Numbers of lax three-component Hangul characters each of which is combination of the two-component Hangul character assigned to the button of the left column in the same row and a lax final sound component are indicated at the segments assigned to the buttons of the center column ("2", "5", "8" and "0" buttons). Numbers of un-lax three-component Hangul characters each of which is combination of the two-component Hangul character assigned to the button of the left column in the same row and an un-lax final sound component are indicated at the segments assigned to the buttons of the right column ("3", "6", "9" and "#" buttons). When there is a single three-component Hangul character for each row of the center or right column, the three-component Hangul character itself is displayed at the segment.

When the operator hits the "2" button to which the number "8" is assigned as shown in the shaded segment in FIG. 16c at this timing (S004), eight varieties of lax three-component Hangul characters, which are combinations of the two-component Hangul character displayed on the same row as the number "8" assigned to the "2" button and lax final sound components, are extracted from the lax three-component Hangul character dictionary 114 and are displayed in the standard candidate display area 20b as shown in FIG. 16d (S005, S006, S101, S113, S201, S207 and S208). The respective characters are indicated at the segments in the area 20b that correspond to the buttons of the ten-digit keypad of the keyboard 21 to which the respective characters are assigned.

When the operator hits the "2" button under this condition (S004), the lax three-component Hangul character assigned to the "2" button as shown in the shaded segment in FIG. 16d, which is the first character of the Hangul character string whose meaning is "telephone", is confirmed as the input Hangul character (S005, S006, S101, S113, S201 and S202). Then, "NULL" is recorded in the pointer buffer 13 to set the input stage at the first stage 14a for selecting an initial sound component (S203). The confirmed input Hangul character is displayed in the text display area 20a and ten groups including nineteen varieties of initial sound components are displayed in the standard candidate display area 20b according to the definition of the initial sound component table 111 as shown in FIG. 16e (S204). The respective groups are indicated at the segments in the area 20b that represent the buttons of the ten-digit keypad of the keyboard 21 to which the respective groups are assigned.

When the operator hits the "0" button under this condition (S004), the initial sound component group assigned to the "0" button in the initial sound component table 111 is selected (S005, S006, S101 and S102). That is, the two initial sound components displayed at the shaded segment in FIG. 16e are selected. The button value input at S004 is stored in the pointer buffer 13 to set the input stage at the second stage 14b for selecting a medium sound component (S103). Then, the selected two initial sound components are displayed behind the input Hangul character in the text display area 20a and twelve groups including twenty-one varieties of medium sound components are displayed in the standard candidate display area 20b according to the definition of the medium sound component table 112 as shown in FIG. 16f (S104). The respective groups are indicated at the segments in the area 20b that correspond to the buttons of the ten-digit keypad, the asterisk button and the sharp button of the keyboard 21 to which the respective groups are assigned.

When the operator hits the "9" button of the ten-digit keypad (S004), the medium sound component group assigned to the "9" button in the medium sound component table 112 is selected (S005, S006, S101 and S107). That is, the two medium sound components displayed at the shaded segment in FIG. 16f are selected.

The button value input at S004 is stored in the pointer buffer 13 to set the input stage at the third stage 14c for selecting a character (S108). Then, the two initial sound components displayed in the text display area 20a are cleared and the contents of the record extracted from the Hangul character table 113 corresponding to the button value "0" for the initial sound component and the button value "9" for the medium sound component are displayed in the standard candidate display area 20b (S109, S110) as shown in FIG. 16g. The respective contents are indicated at the segments in the area 20b that correspond to the buttons of the ten-digit keypad, the asterisk button and the sharp button of the keyboard 21 to which the respective contents are assigned.

When the operator hits the "4" button of the ten-digit keypad (S004), the two-component Hangul character assigned to the "4" button as shown in the shaded segment in FIG. 16g, which is the second character of the Hangul character string whose meaning is a "telephone", is confirmed as the input Hangul character (S005, S006, S101, S113, S201 and S202). Then, "NULL" is recorded in the pointer buffer 13 to set the input stage at the first stage 14a for selecting an initial sound component (S203). The confirmed input Hangul character is appended in the text display area 20a and ten groups including nineteen varieties of initial sound components are displayed in the standard candidate display area 20b according to the definition of the initial sound component table 111 as shown in FIG. 16h (S204). The respective groups are indicated at the segments in the area 20b that represent the buttons of the ten-digit keypad of the keyboard 21 to which the respective groups are assigned.

According to the Hangul character input method of the first embodiment, the first and second keystrokes can narrow two-component Hangul character candidates, which should be included in the target Hangul character, to four varieties at the maximum, the third keystroke can confirm one of the four varieties of the two-component Hangul characters as the target Hangul character or can narrow three-component Hangul character candidates to nine varieties of lax three-component Hangul characters at the maximum and eight varieties of un-lax three-component Hangul characters at the maximum that include any one of the two-component Hangul characters. The fourth keystroke can confirm a lax three-component Hangul character or an un-lax three-component Hangul character as the target Hangul character.

In other words, according to the first embodiment, a target Hangul character is confirmed by one keystroke in the first stage 14a for selecting an initial sound component group, one keystroke in the second stage 14b for selecting a medium sound component group and one or two keystrokes in the third stage 14c for selecting a character. That is, according to the first embodiment, an operator can efficiently input a common Hangul character into the cellular phone 1 by three or four keystrokes with the keyboard 21 having twelve buttons.

Further, since the Hangul character input method of the first embodiment uses an input procedure based on taxonomy of the final sound components that is newly developed according to the phonology of the Hangul, an operator can easily understand the input procedure and can easily input a Hangul character.

Second Embodiment

A Hangul character input method of the second embodiment uses a fixed un-lax three-component Hangul character dictionary 115' shown in FIG. 17 instead of the un-lax three-component Hangul character dictionary 115 (FIG. 8) used in the first embodiment so that any Hangul character (a common Hangul character and an uncommon Hangul character) can be input. For the second embodiment, only different constructions from the first embodiment will be described.

As shown in FIG. 17, the fixed un-lax three-component Hangul character dictionary 115' has records corresponding to the respective two-component Hangul characters. Each record includes eighteen fields for eighteen varieties of un-lax three-component Hangul characters, respectively. There are seven varieties of un-doublet final sound components and eleven varieties of doublet final sound components. The first seven fields are assigned to un-lax three-component Hangul characters that are combinations of the two-component Hangul character with seven varieties of un-doublet final sound components and the next eleven fields are assigned to un-lax three-component Hangul characters that are combinations of the two-component Hangul character with eleven varieties of doublet final sound components.

At the third stage 14c for selecting a character in the second embodiment, when an operator hits a button of the keyboard 21 assigned to the number on the right column of the standard candidate display area 20b shown in FIG. 12, seven varieties of un-lax three-component Hangul characters at the maximum that are combinations of the two-component Hangul character displayed at the same row as the number on the left column and the respective un-doublet final sound components are extracted from the fixed un-lax three-component Hangul character dictionary 115' and they are displayed in the standard candidate display area 20b. The displayed un-lax three-component Hangul characters, which do not include doublet final sound components, will be called "un-doublet three-component Hangul characters". The respective un-doublet three-component Hangul characters are indicated at the segments in the area 20b that have been assigned to the respective un-doublet final sound component. Further, "SHIFT" is indicated in the segment assigned to the "0" button.

Under this condition, a keystroke of a button assigned to any un-doublet three-component Hangul character confirms an input of this character. On the other hand, when the operator hits the "0" button assigned to the "SHIFT" segment, eleven varieties of un-lax three-component Hangul characters at the maximum that are combinations of the same two-component Hangul character and the respective doublet final sound components are extracted from the fixed un-lax three-component Hangul character dictionary 115' and they are displayed in the standard candidate display area 20b. The displayed un-lax three-component Hangul characters, which include doublet final sound components, will be called "doublet three-component Hangul characters". The respective doublet three-component Hangul characters are indicated at the segments in the area 20b that have been assigned to the respective doublet final sound component. Under this condition, a keystroke of a button assigned to any doublet three-component Hangul character confirms an input of this character.

FIG. 18 is a flowchart showing the character selecting process (subroutine) executed at S113 in FIG. 14 instead of the subroutine shown in FIG. 15. At the first step S301 in the subroutine, the controller 10 determines a button hit by an operator. Then, the controller 10 brings the process to S302 when the button assigned to a Hangul character (a two-component Hangul character, a lax three-component Hangul character or an un-lax three-component Hangul character displayed at S110, a lax three-component Hangul character displayed at S308, an un-doublet three-component Hangul character displayed at S310 or a doublet three-component Hangul character displayed at S312) is hit. When a button assigned to the number (except "0") on the center column displayed at S110 is hit, the controller 10 brings the process to S307. When a button assigned to the number (except "0") on the right column displayed at S110 is hit, the controller 10 brings the process to S309. When the "0" button assigned to the "SHIFT" segment displayed at S310 is hit, the controller 10 brings the process to S311. On the other hand, when a button assigned to the number "0" displayed at S110 is hit, the controller 10 brings the process to S313.

At S302, the controller 10 extracts a Hangul character assigned to the hit button from the Hangul character table 113, the lax three-component Hangul character dictionary 114 or the fixed un-lax three-component Hangul character dictionary 115', confirming the extracted Hangul character by storing it into the phoneme buffer 21. At the same time, the controller 10 displays the extracted Hangul character at the end of input character string in the text display area 20a of the display 20.

At S303, the controller 10 resets a value recorded in the pointer buffer 13 to "NULL" to set the input stage at the first stage 14a for selecting an initial sound component.

At S304, the controller 10 displays ten groups including nineteen varieties of initial sound components at segments representing assigned buttons in the standard candidate display area 20b of the display 20 with reference to the initial sound component table 111. Then, indications in the standard candidate display area 20b are replaced as shown in FIG. 10.

At S305, the controller 10 searches the next candidate character dictionary 117 based on the character string displayed in the text display area 20a to extract twelve varieties of Hangul characters that are most frequently used to follow a context formed by input Hangul character string.

At S306, the controller 10 displays twelve varieties of the common Hangul characters extracted from the next candidate character dictionary 117 at S305 in the advanced candidate display area 20c of the display 20 as the next candidates. When the process at S306 is completed, the controller 10 finishes the character selecting process (subroutine) and the standard selecting process (subroutine), returning the process to S004 in the main routine shown in FIG. 13.

On the other hand, at S307, the controller 10 searches the lax three-component Hangul character dictionary 114 based on the two-component Hangul character displayed on the left column in the same row as the number assigned to the hit button in the standard candidate display area 20b to extract the lax three-component Hangul characters that are combinations of the two-component Hangul character and the lax final sound components.

At S308, the controller 10 displays the lax three-component Hangul characters extracted at S307 at the segments corresponding to the buttons of the ten-digit keypad representing the final sound components included in the extracted characters in the standard candidate display area 20b of the display 20. When the process at S308 is completed, the controller 10 finishes the character selecting process (subroutine) and the standard selecting process (subroutine), returning the process to S004 in the main routine shown in FIG. 13.

On the other hand, at S309, the controller 10 searches the fixed un-lax three-component Hangul character dictionary 115' based on the two-component Hangul character displayed on the left column in the same row as the number assigned to the hit button in the standard candidate display area 20b to extract the un-doublet three-component Hangul characters that are combinations of the two-component Hangul character and the un-doublet final sound components.

At S310, the controller 10 displays the un-doublet three-component Hangul characters extracted at S309 at the segments corresponding to the buttons of the ten-digit keypad representing the un-doublet final sound components included in the extracted characters in the standard candidate display area 20b of the display 20. When the process at S310 is completed, the controller 10 finishes the character selecting process (subroutine) and the standard selecting process (subroutine), returning the process to S004 in the main routine shown in FIG. 13.

On the other hand, at S311, the controller 10 searches the fixed un-lax three-component Hangul character dictionary 115' based on the two-component Hangul character included in the respective un-doublet three-component Hangul characters displayed in the standard candidate display area 20b at the time to extract doublet three-component Hangul characters that are combinations of the two-component Hangul character and the doublet final sound components.

At S312, the controller 10 displays the doublet three-component Hangul characters extracted at S311 at the segments corresponding to the buttons of the ten-digit keypad representing the doublet final sound components included in the extracted characters in the standard candidate display area 20b of the display 20. When the process at S312 is completed, the controller 10 finishes the character selecting process (subroutine) and the standard selecting process (subroutine), returning the process to S004 in the main routine shown in FIG. 13.

On the other hand, at S313, the controller 10 finishes the character selecting process (subroutine) and the standard selecting process (subroutine) without executing process corresponding to the hit button, returning the process to S004 in the main routine shown in FIG. 13.

<Hangul Character Input Method>

A process to input a Hangul character according to the second embodiment will be described with reference to FIG. 19a through FIG. 19f. FIG. 19a through FIG. 19f show changes of indication contents in the standard candidate display area 20b and the text display area 20a at respective steps to input a Hangul character. In FIG. 19a through FIG. 19f, indication contents in the advanced candidate display area 20c are omitted.

When the input mode of the cellular phone is changed to the Hangul character input mode under the condition where no characters are displayed in the text display area 20a, "NULL" is set in the pointer buffer 13 to set the input stage at the first stage 14a for selecting an initial sound component (S001). Then, ten groups including nineteen varieties of initial sound components are displayed in the standard candidate display area 20b according to the definition of the initial sound component table 111 as shown in FIG. 19a (S002). The respective groups are indicated at the segments in the area 20b that represent the buttons of the ten-digit keypad of the keyboard 21 to which the respective groups are assigned.

When an operator hits the "1" button of the ten-digit keypad (S004), the initial sound component group assigned to the "1" button in the initial sound component table 111 is selected (S005, S006, S101 and S102). That is, the two initial sound components displayed at the shaded segment in FIG. 19a are selected. The button value input at S004 is stored in the pointer buffer 13 to set the input stage at the second stage 14b for selecting a medium sound component (S103). Then, the selected two initial sound components are displayed in the text display area 20a and twelve groups including twenty-one varieties of medium sound components are displayed in the standard candidate display area 20b according to the definition of the medium sound component table 112 as shown in FIG. 19b (S104). The respective groups are indicated at the segments in the area 20b that correspond to the buttons of the ten-digit keypad, the asterisk button and the sharp button of the keyboard 21 to which the respective groups are assigned.

When the operator hits the "1" button of the ten-digit keypad (S004), the medium sound component group assigned to the "1" button in the medium sound component table 112 is selected (S005, S006, S101 and S107). That is, the medium sound component displayed in the shaded segment in FIG. 19b is selected. The button value input at S004 is stored in the pointer buffer 13 to set the input stage at the third stage 14c for selecting a character (S108). Then, the two initial sound components displayed in the text display area 20a are cleared and the contents of the record extracted from the Hangul character table 113 corresponding to the button value "1" for the initial sound component and the button value "1" for the medium sound component are displayed in the standard candidate display area 20b (S109, S110) as shown in FIG. 19c. The respective contents are indicated at the segments in the area 20b that correspond to the buttons of the ten-digit keypad, the asterisk button and the sharp button of the keyboard 21 to which the respective contents are assigned.

When the operator hits the "3" button under the condition (S004), five varieties of un-doublet three component Hangul characters, which are combinations of the two-component Hangul character displayed on the left column in the same row as the number ("8" displayed at the shaded segment in FIG. 19c) assigned to the "3" button with the un-doublet final sound components, are extracted from the fixed un-lax three-component Hangul character dictionary 115' and they are displayed at the segments corresponding to the buttons of the ten-digit keypad in the standard candidate display area 20b with "SHIFT" as shown in FIG. 19d (S005, S006, S101, S113, S301, S309 and S310).

When the operator hits the "0" button under the condition (S004), three varieties of doublet three-component Hangul characters, which are combinations of the two-component Hangul character included in the un-doublet three-component Hangul characters assigned to the buttons of the ten-digit keypad except for the "0" button with the doublet final sound component, are extracted from the fixed un-lax three-component Hangul character dictionary 115' and they are displayed at the segments corresponding to the buttons of the ten-digit keypad in the standard candidate display area 20b as shown in FIG. 19e (S005, S006, S101, S113, S301, S311 and S312).

When the operator hits the "4" button under this condition (S004), the doublet three-component Hangul character (S004), the doublet three-component Hangul character assigned to the "4" button as shown in the shaded segment in FIG. 19e is confirmed as the input Hangul character (S005, S006, S101, S113, S301 and S302). Then, "NULL" is set in the pointer buffer 13 to set the input stage at the first stage 14a for selecting an initial sound component (S303). The confirmed input Hangul character is displayed in the text display area 20a and ten groups including nineteen varieties of initial sound components are displayed in the standard candidate display area 20b according to the definition of the initial sound component table 111 as shown in FIG. 19f (S304). The respective groups are indicated at the segments in the area 20b that represent the buttons of the ten-digit keypad of the keyboard 21 to which the respective groups are assigned.

According to the Hangul character input method of the second embodiment, the first and second keystrokes can narrow two-component Hangul character candidates, which should be included in the target Hangul character, to four varieties at the maximum, the third keystroke can select and confirm one of the four varieties of the two-component Hangul characters as the target Hangul character or can narrow three-component Hangul character candidates to nine varieties of lax three-component Hangul characters at the maximum or eighteen varieties of un-lax three-component Hangul characters at the maximum that include any one of the two-component Hangul characters. The fourth keystroke can select and confirm a three-component Hangul character from nine varieties of lax three-component Hangul characters at the maximum or from seven varieties of un-doublet three-component Hangul characters at the maximum, or can switch over the candidates to eleven varieties of doublet three-component Hangul characters. When the doublet three-component Hangul characters become candidates, the fifth keystroke can select and confirm one of the doublet three-component Hangul characters as the target Hangul character.

In other words, according to the second embodiment, a target Hangul character is confirmed by one keystroke in the first stage 14a for selecting an initial sound component group, one keystroke in the second stage 14b for selecting a medium sound component group and one through three keystroke in the third stage 14c for selecting a character. That is, according to the second embodiment, an operator can efficiently input a common or uncommon Hangul character into the cellular phone 1 by three through five keystrokes with the keyboard 21 having twelve buttons.

Furthermore, according to the Hangul character input method of the second embodiment, not only lax three-component Hangul characters but also un-doublet/doublet three-component Hangul characters are displayed at segments representing the buttons to which the final sound components are assigned when a character is selected. Therefore, an operator can select a target Hangul character by blind touch if the operator memorizes positions of the buttons that are assigned to the respective final sound components.

According to the present invention, a target Hangul character can be determined through a small number of keystrokes with a keyboard having limited number of buttons.

What is claimed is:

1. A Hangul character input program running on a computer for inputting a Hangul character that consists of an initial sound component and a medium sound component with or without a final sound component, said program comprising:

a step for allowing a reference to an initial sound component table that stores initial sound components divided into groups, a medium sound component table that stores medium sound components divided into groups, a two-component Hangul character table that stores two-component Hangul characters, each of which is a combination of initial and medium sound components, that are divided into groups according to combinations of the group of the initial sound component and the group of the medium sound component, and a three-component Hangul character table that stores three-component Hangul characters, each of which is a combination of a two-component Hangul character and a final sound component, that are divided into groups according to the two-component Hangul character included therein;

a first specifying step for specifying one group of initial sound components stored in said initial sound component table;

a second specifying step for specifying one group of medium sound components stored in said medium sound component table;

a third specifying step for specifying one of two-component Hangul characters extracted from said two-component Hangul character table in response to combinations of the initial sound components in the group specified at said first specifying step and the medium sound components in the group specified at said second specifying step, or specifying one group of the three-component Hangul characters among the groups extracted from said three-component Hangul character table in response to said two-component Hangul characters extracted from said two-component Hangul character table; and a fourth specifying step for specifying one of three-component Hangul characters included in the group of the three-component Hangul character specified at said third specifying step, said fourth specifying step being optionally executed when the group of the three-component Hangul character is specified at said third specifying step.

2. The Hangul character input program according to claim 1, wherein said three-component Hangul character table includes:

a lax three-component Hangul character table that stores groups of lax three-component Hangul characters that are combinations of two-component Hangul characters with lax final sound components each of which has the same shape as a lax initial sound component, and a un-lax three-component Hangul character table that stores groups of un-lax three-component Hangul characters that are combinations of two-component Hangul characters with un-lax final sound components each of which has a different shape from a lax initial sound component, wherein one of said two-component Hangul characters, one group of lax three-component Hangul characters extracted from said lax three-component Hangul character table in response to said two-component Hangul characters or one group of un-lax three-component Hangul characters extracted from said un-lax three-component Hangul character table in response to said two-component Hangul characters is specified at said third specifying step, and wherein one of lax three-component Hangul characters in the group specified at said third specifying step or one of un-lax three-component Hangul characters in the group specified at said third specifying step is specified at said fourth specifying step.

3. A Hangul character input device for inputting a Hangul character that consists of an initial sound component and a medium sound component with or without a final sound component, said device comprising:

an input portion;

an initial sound component table that stores initial sound components divided into groups;

a medium sound component table that stores medium sound components divided into groups;

a two-component Hangul character table that stores two-component Hangul characters, each of which is a combination of initial and medium sound components, that are divided into groups according to combinations of the group of the initial sound component and the group of the medium sound component;

a three-component Hangul character table that stores three-component Hangul characters, each of which is a combination of a two-component Hangul character and a final sound component, that are divided into groups according to the two-component Hangul character included therein;

a controller that executes a first specifying step for specifying a group of initial sound components in response to information input by said input portion;

a second specifying step for specifying a group of medium sound components in response to information input by said input portion;

a third specifying step for specifying one of two-component Hangul characters extracted from said two-component Hangul character table in response to combinations of the initial sound components in the group specified at said first specifying step and the medium sound components in the group specified at said second specifying step, or specifying one group of the three-component Hangul characters among the groups extracted from said three-component Hangul character table in response to said two-component Hangul characters extracted from said two-component Hangul character table; and a fourth specifying step for specifying one three-component Hangul character among the three-component Hangul characters included in the group extracted from said three-component Hangul character table in response to the specified group of the three-component Hangul character, said fourth specifying step being optionally executed when the group of the three-component Hangul character is specified at said third specifying step.

4. A Hangul character input method for inputting a Hangul character that consists of an initial sound component and a medium sound component with or without a final sound component to an information processing device, said method comprising:

a first stage for dividing initial sound components into groups and specifying a group of initial sound components;

a second stage for dividing medium sound components into groups and specifying a group of medium sound components;

a third stage for specifying one of two-component Hangul characters consisting of the combinations of the initial and medium sound components specified at said first and second stages or one group of the three-component Hangul characters that include said specified combinations and final sound components; and a fourth stage for specifying one of three-component Hangul characters included in the group specified at said third stage, said fourth stage being optionally executed when the group of the three-component Hangul character is specified at said third stage.

5. A computer media with a Hangul character input program running on a computer for inputting a Hangul character that consists of an initial sound component and a medium sound component with or without a final sound component, said program comprising:

a step for allowing a reference to an initial sound component table that stores initial sound components divided into groups, a medium sound component table that stores medium sound components divided into groups, a two-component Hangul character table that stores two-component Hangul characters, each of which is a combination of initial and medium sound components, that are divided into groups according to combinations of the group of the initial sound component and the group of the medium sound component, and a three-component Hangul character table that stores three-component Hangul characters, each of which is a combination of a two-component Hangul character and a final sound component, that are divided into groups according to the two-component Hangul character included therein;

a first specifying step for specifying one group of initial sound components stored in said initial sound component table;

a second specifying step for specifying one group of medium sound components stored in said medium sound component table;

a third specifying step for specifying one of two-component Hangul characters extracted from said two-component Hangul character table in response to combinations of the initial sound components in the group specified at said first specifying step and the medium sound components in the group specified at said second specifying step, or specifying one group of the three-component Hangul characters among the groups extracted from said three-component Hangul character table in response to said two-component Hangul characters extracted from said two-component Hangul character table; and a fourth specifying step for specifying one of three-component Hangul characters included in the group of the three-component Hangul character specified at said third specifying step, said fourth specifying step being optionally executed when the group of the three-component Hangul character is specified at said third specifying step.

6. A Hangul character input program running on a computer having an input portion with buttons for inputting a Hangul character that consists of an initial sound component and a medium sound component with or without a final sound component, said program comprising:

a step for allowing a reference to a first table that stores initial sound components divided into groups, a second table that stores medium sound components divided into groups, a third table that stores two-component Hangul characters each of which is a combination of initial and medium sound components and groups of three-component Hangul characters divided according to said combination, a fourth table that stores three-component Hangul characters whose final sound component has the same shape as a lax initial sound component, and a fifth table that stores three-component Hangul characters whose final sound component has a different shape from a lax initial sound component, wherein said three-component Hangul characters in said fourth and fifth tables are grouped according to said combination;

a step for assigning said groups of initial sound components to said buttons, respectively, and for specifying a group of initial sound components corresponding to the hit button when any button is hit;

a step for assigning said groups of medium sound components to said buttons, respectively, and for specifying a group of medium sound components corresponding to the hit button when any button is hit;

a step for searching said third table with the specified combinations of the initial and medium sound components to extract two-component Hangul characters consisting of said specified combinations and said groups of three-component Hangul characters that include said specified combinations;

a step for assigning said two-component Hangul characters and said groups extracted from said third table to said buttons;

a step for confirming an input of the Hangul character when a button assigned to any Hangul character is hit;

a step for extracting three-component Hangul characters of the group assigned to the hit button from said fourth or fifth table when a button assigned to any group is hit; and a step for confirming an input of the Hangul character when a button assigned to any three-component Hangul character is hit.

7. The Hangul character input program according to claim 6, wherein a keystroke of the button to which one of said groups is assigned immediately confirms the three-component Hangul character when said group includes only one three-component Hangul character.

8. The Hangul character input program according to claim 6 running on said computer further comprising a display, wherein said display indicates, said groups of initial sound components at the positions corresponding to said buttons when said groups of initial sound components are assigned to said buttons, said groups of medium sound components at the position corresponding to said buttons when said groups of medium sound components are assigned to said buttons, said two-component Hangul characters and symbols representing said groups of three-component Hangul characters at the positions corresponding to said buttons when they are extracted from said third table, and said three-component Hangul characters at the position corresponding to said buttons when said three-component Hangul characters are extracted from said fourth or fifth table.

9. The Hangul character input program according to claim 8, wherein said display indicates a three-component Hangul character instead of said symbol and a keystroke of the button to which said three-component Hangul character is assigned confirms the three-component Hangul character when said group represented by said symbol includes only one three-component Hangul character.

10. The Hangul character input program according to claim 8, wherein said display indicates the three-component Hangul characters that do not include doublet final sound components extracted from said fifth table at the positions corresponding to said buttons when the button assigned to said group of the three-component Hangul characters that are combinations of said two-component Hangul character with final sound components each of which has a different shape from lax initial sound components is hit, and a keystroke of the button assigned to one of said three-component Hangul characters confirms an input of said three-component Hangul character, and wherein said display indicates the three-component Hangul characters that include doublet final sound components extracted from said fifth table at the positions corresponding to said buttons when the predetermined button other than said buttons assigned to said three-component Hangul characters is hit, and a keystroke of the button assigned to one of said three-component Hangul characters confirm an input of said three-component Hangul character.

11. A Hangul character input device for inputting a Hangul character that consists of an initial sound component and a medium sound component with or without a final sound component, said device comprising:

a plurality of buttons;

a first memory that stores initial sound components divided into groups;

a second memory that stores medium sound components divided into groups;

a third memory that stores two-component Hangul characters each of which is a combination of initial and medium sound components and groups of three-component Hangul characters divided according to said combination;

a fourth memory that stores three-component Hangul characters whose final sound components each of which has the same shape as a lax initial sound component;

a fifth memory that stores three-component Hangul characters whose final sound components each of which has a different shape from a lax initial sound component; and a controller that executes a step for assigning said groups of initial sound components to said buttons, respectively, with reference to said first memory and specifying a group of initial sound components corresponding to the hit button when any button is hit, a step for assigning said groups of medium sound components to said buttons, respectively, with reference to said second memory and for specifying a group of medium sound components corresponding to the hit button when any button is hit, a step for searching said third memory to extract two-component Hangul characters consisting of the combinations of the specified initial and medium sound components and the groups of three-component Hangul characters that include said specified combinations, a step for assigning said two-component Hangul characters and said groups extracted from said third memory to said buttons, a step for confirming an input of the Hangul character when a button assigned to any two-component Hangul character is hit, a step for extracting three-component Hangul characters from said fourth or fifth memory and for assigning said three-component Hangul characters to said buttons when a button assigned to any group is hit, and a step for confirming an input of the Hangul character when a button assigned to any three-component Hangul character is hit.

12. A Hangul character input method for inputting a Hangul character that consists of an initial sound component and a medium sound component with or without a final sound component to an information processing device through operations of a plurality of buttons thereof, said method comprising:

a first stage for dividing initial sound components into groups, assigning said groups to said buttons and specifying a group of initial sound components corresponding to the hit button when any button is hit;

a second stage for dividing medium sound components into groups, assigning said groups to said buttons and specifying a group of medium sound components corresponding to the hit button when any button is hit;

a third stage for assigning two-component Hangul characters consisting of the combinations of the initial and medium sound components specified at said first and second stages and the groups of three-component Hangul characters that include said specified combinations and final sound components to said buttons, for confirming an input of the Hangul character when a button assigned to any two-component Hangul character is hit, for extracting three-component Hangul characters that are included in the groups corresponding to the hit button when the button assigned to any symbol is hit, for assigning the extracted three-component Hangul characters to said buttons and for confirming an input of the three-component Hangul character when a button assigned to any three-component Hangul character is hit.

13. A computer media with a Hangul character input program running on a computer comprising an input portion with buttons for inputting a Hangul character that consists of an initial sound component and a medium sound component with or without a final sound component, said program comprising:

a step for referring a first table that stores initial sound components divided into groups, a second table that stores medium sound components divided into groups, a third table that stores two-component Hangul characters each of which is a combination of initial and medium sound components and groups of three-component Hangul characters divided according to said combination, a fourth table that stores three-component Hangul characters whose final sound component has the same shape as a lax initial sound component, and a fifth table that stores three-component Hangul characters whose final sound component has a different shape from a lax initial sound component, wherein said three-component Hangul characters in said fourth and fifth tables are grouped according to said combination;

a step for assigning said groups of initial sound components to said buttons, respectively, and for specifying a group of initial sound components corresponding to the hit button when any button is hit;

a step for assigning said groups of medium sound components to said buttons, respectively, and for specifying a group of medium sound components corresponding to the hit button when any button is hit;

a step for searching said third table with the specified combinations of the initial and medium sound components to extract two-component Hangul characters consisting of said specified combinations and said groups of three-component Hangul characters that include said specified combinations;

a step for assigning said two-component Hangul characters and said groups extracted from said third table to said buttons;

a step for confirming an input of the Hangul character when a button assigned to any Hangul character is hit;

a step for extracting three-component Hangul characters of the group assigned to the hit button from said fourth or fifth table when a button assigned to any group is hit; and a step for confirming an input of the Hangul character when a button assigned to any three-component Hangul character is hit.

* * * * *

UNITED STATES PATENT AND TRADEMARK OFFICE
CERTIFICATE OF CORRECTION

PATENT NO. : 7,245,290 B2  Page 1 of 1
APPLICATION NO. : 10/664910
DATED : July 17, 2007
INVENTOR(S) : Jin Sugano It is certified that error appears in the above-identified patent and that said Letters Patent is hereby corrected as shown below:

On the Title Page, Column 1, Item - 73 - (Assignee), change "Kawasaki Limited," to --Fujitsu Limited,--.

Signed and Sealed this

Twentieth Day of May, 2008

JON W. DUDAS
*Director of the United States Patent and Trademark Office*